United States Patent
Kitamura

(10) Patent No.: US 10,209,589 B2
(45) Date of Patent: Feb. 19, 2019

(54) DISPLAY APPARATUS

(71) Applicant: Japan Display Inc., Tokyo (JP)

(72) Inventor: Ayato Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/697,836

(22) Filed: Sep. 7, 2017

(65) Prior Publication Data

US 2018/0081248 A1    Mar. 22, 2018

(30) Foreign Application Priority Data

Sep. 20, 2016    (JP) ................................. 2016-183513

(51) Int. Cl.
| | |
|---|---|
| *G02F 1/1362* | (2006.01) |
| *G02F 1/1335* | (2006.01) |
| *G02F 1/1339* | (2006.01) |
| *G02F 1/1343* | (2006.01) |
| *G09G 3/36* | (2006.01) |

(52) U.S. Cl.
CPC ...... *G02F 1/136277* (2013.01); *G02F 1/1339* (2013.01); *G02F 1/133606* (2013.01); *G02F 1/133621* (2013.01); *G02F 1/134363* (2013.01); *G09G 3/36* (2013.01); *G02F 2001/136281* (2013.01)

(58) Field of Classification Search
CPC ......... G02F 1/136277; G02F 1/133621; G02F 1/1339; G02F 1/134363; G02F 1/133606; G09G 3/36; H04N 5/58; H05B 33/0872
See application file for complete search history.

(56) References Cited

U.S. PATENT DOCUMENTS

| | | | | |
|---|---|---|---|---|
| 7,564,438 B2 * | 7/2009 | Kao | ..................... | G09G 3/2059 345/207 |
| 8,390,640 B2 * | 3/2013 | Aoki | ........................ | H04N 9/73 345/207 |
| 2015/0070406 A1 * | 3/2015 | Baek | ..................... | G09G 3/3406 345/690 |
| 2015/0332634 A1 * | 11/2015 | Xu | ...................... | G02F 1/13454 345/690 |
| 2017/0303365 A1 * | 10/2017 | Chen | .................. | H05B 33/0872 |

FOREIGN PATENT DOCUMENTS

| | | | | |
|---|---|---|---|---|
| EP | 0823587 A1 * | 2/1998 | .......... | G02B 6/0051 |
| JP | 2008-242354 A | 10/2008 | | |

\* cited by examiner

*Primary Examiner* — Sardis F Azongha
(74) *Attorney, Agent, or Firm* — Michael Best & Friedrich LLP

(57) ABSTRACT

According to an aspect, a display apparatus includes: a first light-transmissive substrate; a second light-transmissive substrate facing the first light-transmissive substrate; a liquid crystal layer sealed between the first light-transmissive substrate and the second light-transmissive substrate, and including polymer dispersed liquid crystal; at least one light-emitting device facing at least one of a side surface of the first light-transmissive substrate or a side surface of the second light-transmissive substrate; and a display controller configured to perform control so as to reduce power consumption based on a signal, the signal being in accordance with a signal of external light intensity information supplied from an external light setting device.

8 Claims, 17 Drawing Sheets

DISPLAY APPARATUS

CROSS-REFERENCE TO RELATED APPLICATIONS

This application claims priority from Japanese Application No. 2016-183513, filed on Sep. 20, 2016, the contents of which are incorporated by reference herein in its entirety.

BACKGROUND

1. Technical Field

The present disclosure relates to a display apparatus.

2. Description of the Related Art

Japanese Patent Application Laid-open Publication No. 2008-242354 (JP-A-2008-242354) discloses a display apparatus including light intensity sensors.

In the self-luminescent display apparatus disclosed in JP-A-2008-242354, background light on a second surface side opposite to a first surface side of a display panel is blocked, which make it hard for a background on the second surface side to be visually recognized from the first surface of the display panel.

SUMMARY

According to an aspect, a display apparatus includes: a first light-transmissive substrate; a second light-transmissive substrate facing the first light-transmissive substrate; a liquid crystal layer sealed between the first light-transmissive substrate and the second light-transmissive substrate, and including polymer dispersed liquid crystal; at least one light-emitting device facing at least one of a side surface of the first light-transmissive substrate or a side surface of the second light-transmissive substrate; and a display controller configured to perform control so as to reduce power consumption based on a signal, the signal being in accordance with a signal of external light intensity information supplied from an external light setting device.

DETAILED DESCRIPTION

Figure 1:
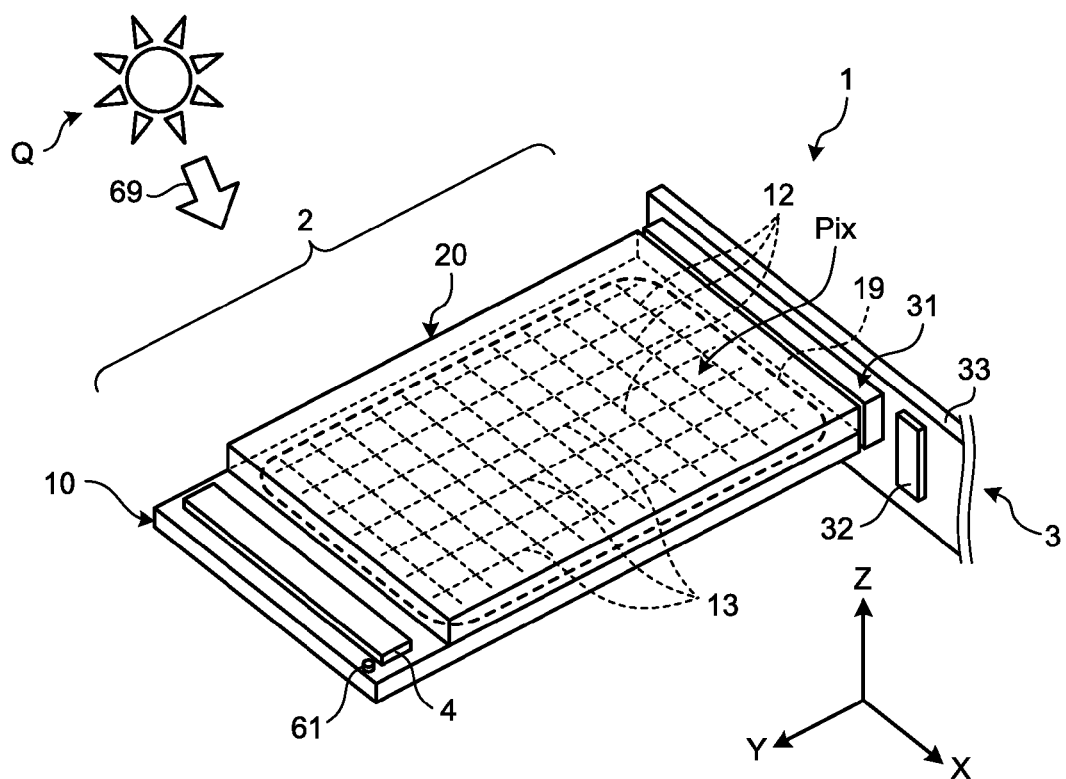
FIG. 1 is a perspective view illustrating an example of a display apparatus according to a configurational embodiment.

Modes (embodiments) for carrying out the present disclosure will be described in detail with reference to the drawings. The present disclosure is not limited by the descriptions of the following embodiments. The elements described hereunder include those that can be easily thought of by those skilled in the art and substantially the same elements. The elements described hereunder may also be combined as appropriate. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases. In this disclosure, when an element is described as being "on" another element, the element can be directly on the other element, or there can be one or more elements between the element and the other element.

Figure 2:
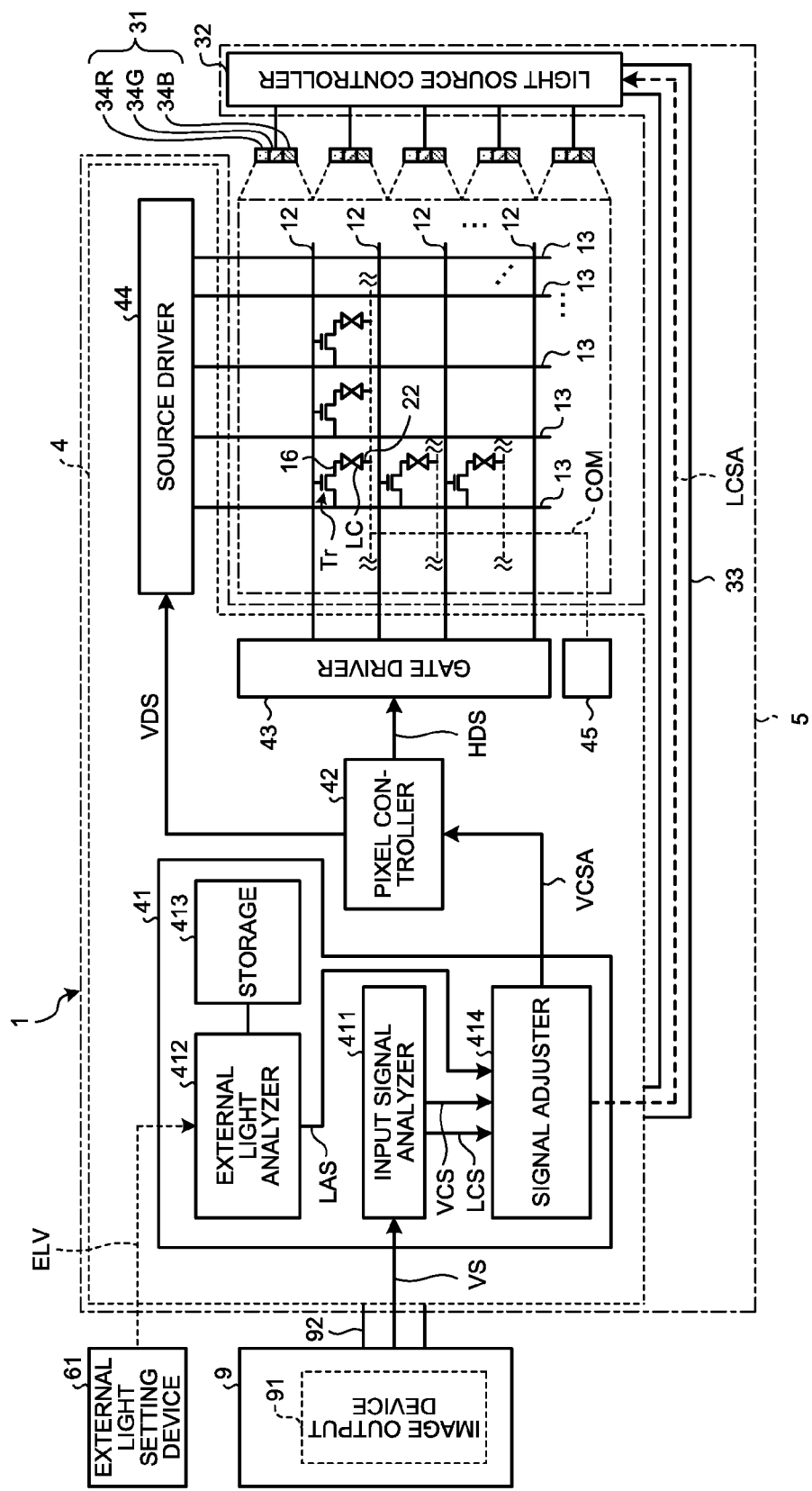
FIG. 2 is a block diagram illustrating the display apparatus of FIG. 1.
Figure 3:
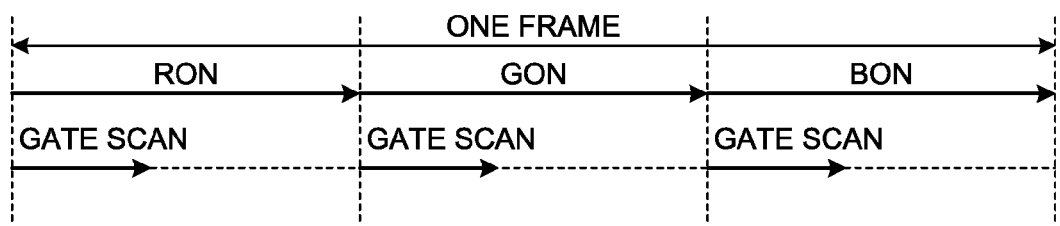
FIG. 3 is a timing chart for explaining timing to emit light by a light source according to a field sequential method.

FIG. 1 is a perspective view illustrating an example of a display apparatus according to a configurational embodiment. FIG. 2 is a block diagram illustrating the display apparatus of FIG. 1. FIG. 3 is a timing chart for explaining timing to emit light by a light source according to a field sequential method.

As illustrated in FIG. 1, a display apparatus 1 includes: a display panel 2; a side light source device 3; a drive circuit 4 that constitutes a part of a display controller 5 (see FIG. 2) to be described below; and an external light setting device 61. Here, one direction of the plane of the display panel 2 is referred to as an X direction, a direction that is orthogonal to the X direction is referred to as a Y direction, and a direction that is orthogonal to an X-Y plane is referred to as a Z direction.

Figure 5:
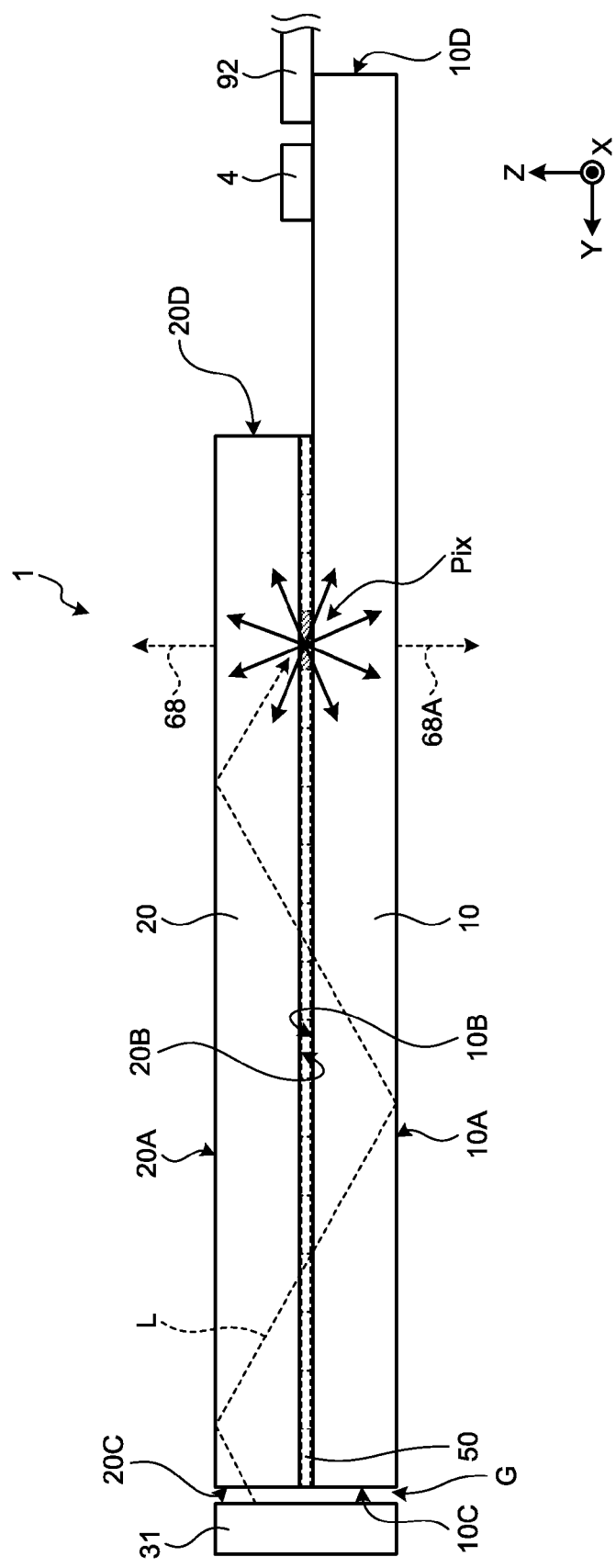
FIG. 5 is a cross-sectional view illustrating an example of a cross-section of the display apparatus of FIG. 1.

The display panel 2 includes a first light-transmissive substrate 10, a second light-transmissive substrate 20, and a liquid crystal layer 50 (see FIG. 5). The second light-transmissive substrate 20 faces the first light-transmissive substrate 10 in a direction (the Z direction illustrated in FIG. 1) perpendicular to the surface of the first light-transmissive substrate 10. Polymer dispersed liquid crystal described below is sealed in the liquid crystal layer 50 (see FIG. 5) with the first light-transmissive substrate 10, the second light-transmissive substrate 20, and a sealant 19.

As illustrated in FIG. 1, the inside of the sealant 19 serves as a display area in the display panel 2. In the display area, a plurality of pixels Pix are arranged in a matrix pattern. In the present disclosure, a row refers to a pixel row having m pixels Pix arranged in a direction, and a column refers to a pixel column having n pixels Pix arranged in a direction perpendicular to the direction in which the rows are arranged. The values of m and n are determined according to a display resolution in the vertical direction and a display resolution in the horizontal direction. A plurality of scanning lines 12 are routed in respective rows and a plurality of signal lines 13 are routed in respective columns.

The side light source device 3 includes a light-emitting device 31. As illustrated in FIG. 2, a light source controller 32, a light source substrate 33 in which the light-emitting device 31 and the light source controller 32 are arranged, and the drive circuit 4 constitute the display controller 5. The light source substrate 33 is a flexible substrate and also functions as wiring for electrically coupling the light source controller 32 and the drive circuit 4 with each other (see FIG. 2). The light-emitting device 31 and the light source controller 32 are electrically coupled with each other through wiring in the light source substrate 33.

For example, the external light setting device 61 is an external light intensity sensor, which detects the intensity of external light 69 from an external illuminator Q and generates a signal ELV of external light intensity information according to the intensity of the external light 69. The external light setting device 61 transmits the generated signal ELV of the external light intensity information to the drive circuit 4. The external light setting device 61 is fixed to the surface of the first light-transmissive substrate 10. The external light setting device 61 may be fixed at any position as long as it can detect the intensity of the external light 69 on the periphery of the display panel 2.

For example, the external light setting device 61 is not limited to an external light intensity sensor, and may be an external light intensity setting switch. The external light intensity setting switch generates the signal ELV of the external light intensity information based on a setting value of the external light intensity information set in advance according to the intensity of the external light 69 by an observer. For example, the external light intensity setting switch has predetermined setting values of the external light intensity information for each of environmental modes, such as a sunlight clear sky mode (first environment mode), a sunlight cloudy sky mode (second environment mode), an indoor use mode (third environment mode), and a night-time use mode (fourth environment mode). The setting values of the external light intensity information, for example, are decreased in the order of the sunlight clear sky mode (first environment mode), the sunlight cloudy sky mode (second environment mode), the indoor use mode (third environment mode), and the night-time use mode (fourth environment mode). Thus, the values of the signals ELV of the external light intensity information are also decreased in the order of the sunlight clear sky mode (first environment mode), the sunlight cloudy sky mode (second environment mode), the indoor use mode (third environment mode), and the night-time use mode (fourth environment mode). The external light setting device 61 transmits the generated signal ELV of the external light intensity information to the drive circuit 4. In a case where the external light setting device 61 is an external light intensity setting switch, the external light intensity setting switch may be fixed at any positions as long as it can transmit the signal ELV of the external light intensity information to the drive circuit 4.

As illustrated in FIG. 1, the drive circuit 4 is fixed to the surface of the first light-transmissive substrate 10. As illustrated in FIG. 2, the drive circuit 4 includes an analyzer 41, a pixel controller 42, a gate driver 43, a source driver 44, and a common potential driver 45. The area of the XY plane of the first light-transmissive substrate 10 is larger than that of the second light-transmissive substrate 20, and the drive circuit 4 is disposed in an exposed portion of the first light-transmissive substrate 10 that is exposed from the second light-transmissive substrate 20.

An image input signal (e.g., RGB data) VS is input to the analyzer 41 from an image output device 91 of an external host controller 9 through a flexible substrate 92.

The analyzer 41 includes an input signal analyzer 411, an external light analyzer 412, a storage 413, and a signal adjuster 414. The input signal analyzer 411 generates an image control signal VCS and a light source control signal LCS in accordance with an image input signal VS input from the outside. The light source control signal LCS is, for example, a signal including light amount information of the light-emitting device 31 to be set according to an average of input gradation values for all the pixels Pix. For example, in a case where a dark image is displayed, the light amount of the light-emitting device 31 is set to be small. On the other hand, in a case where a bright image is displayed, the light amount of the light-emitting device 31 is set to be large.

The image control signal VCS is a signal for determining a gradation value to be given to each pixel Pix of the display panel 2 in accordance with the image input signal VS. In other words, the image control signal VCS is a signal including gradation information about a gradation value of each pixel Pix. The pixel controller 42 sets an output gradation value by performing a correction process such as a gamma correction process and an expansion process for an input gradation value of the image control signal VCS.

The signal ELV of the external light intensity information is input to the external light analyzer 412 from the external light setting device 61 described above. The external light analyzer 412 generates an adjustment signal LAS in accordance with the signal ELV of the external light intensity information based on a lookup table stored in the storage 413.

The signal adjuster 414 generates a light source control signal LCSA from the light source control signal LCS in accordance with the adjustment signal LAS, and transmits the generated light source control signal to the light source controller 32. The signal adjuster 414 generates an image control signal VCSA from the image control signal VCS in accordance with the adjustment signal LAS, and transmits the generated image control signal to the pixel controller 42.

The pixel controller 42 then generates a horizontal drive signal HDS and a vertical drive signal VDS in accordance with the image control signal VCSA. In the configurational embodiment, driving is performed by the field sequential method, and thus the horizontal drive signal HDS and the vertical drive signal VDS are generated for each color that can be emitted by the light-emitting device 31.

The gate driver 43 sequentially selects the scanning lines 12 of the display panel 2 in one vertical scanning period in accordance with the horizontal drive signal HDS. The order in which the scanning lines 12 are selected is arbitrary.

The source driver 44 supplies a gradation signal according to an output gradation value of each pixel Pix to each signal line 13 of the display panel 2 in accordance with the vertical drive signal VDS in one horizontal scanning period.

In the configurational embodiment, the display panel 2 is an active matrix-type panel. For this reason, the display panel 2 includes the scanning (gate) lines 12 extending in the X direction and the signal (source) lines 13 extending in the Y direction in the plan view, and includes switching elements Tr at intersections of the scanning lines 12 and the signal lines 13.

A thin film transistor is used as the switching element Tr. Examples of the thin film transistor include, but are not limited to, a bottom gate-type transistor and a top gate-type transistor. In the description, a single-gate thin film transistor is exemplified as the switching element Tr, but a double-gate transistor may be used. One of a source electrode and a drain electrode of the switching element Tr is coupled to the signal line 13, a gate electrode thereof is coupled to the scanning line 12, and the other of the source electrode and the drain electrode is coupled to one end of capacitance LC of a liquid crystal. The capacitance LC of the liquid crystal has one end coupled to the switching element Tr through a pixel electrode 16, and the other end coupled to a common potential COM through a common electrode 22. The common potential COM is supplied from the common potential driver 45.

The light-emitting device 31 includes a luminous body 34R of a first color (for example, red), a luminous body 34G of a second color (for example, green), and a luminous body 34B of a third color (for example, blue). The light source controller 32 controls the luminous body 34R of the first color, the luminous body 34G of the second color, and the luminous body 34B of the third color to emit light in a time division manner, in accordance with the light source control signal LCSA. In this way, the luminous body 34R of the first color, the luminous body 34G of the second color, and the luminous body 34B of the third color are driven by the so-called field sequential method.

As illustrated in FIG. 3, in a first sub-frame (first predetermined time) RON, the luminous body 34R of the first color emits light, and the pixels Pix selected within one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the first color is lighted.

Next, in a second sub-frame (second predetermined time) GON, the luminous body 34G of the second color emits light, and the pixels Pix selected within one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the second color is lighted.

Further, in a third sub-frame (third predetermined time) BON, the luminous body 34B of the third color emits light, and the pixels Pix selected within one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the third color is lighted.

The eyes of a human have a limited temporal resolution, and see an afterimage. Thus, the eyes of a human recognize a synthesized image of three colors in one frame period. The field sequential method requires no color filter, and suppresses an absorption loss in color filters, which can realize high transmittance. In a color filter method, one pixel is made of sub-pixels obtained by dividing the pixel into the first color, the second color, and the third color. On the other hand, the field sequential method does not require such division into sub-pixels, and thus can facilitate increase of the resolution.

Figure 4:
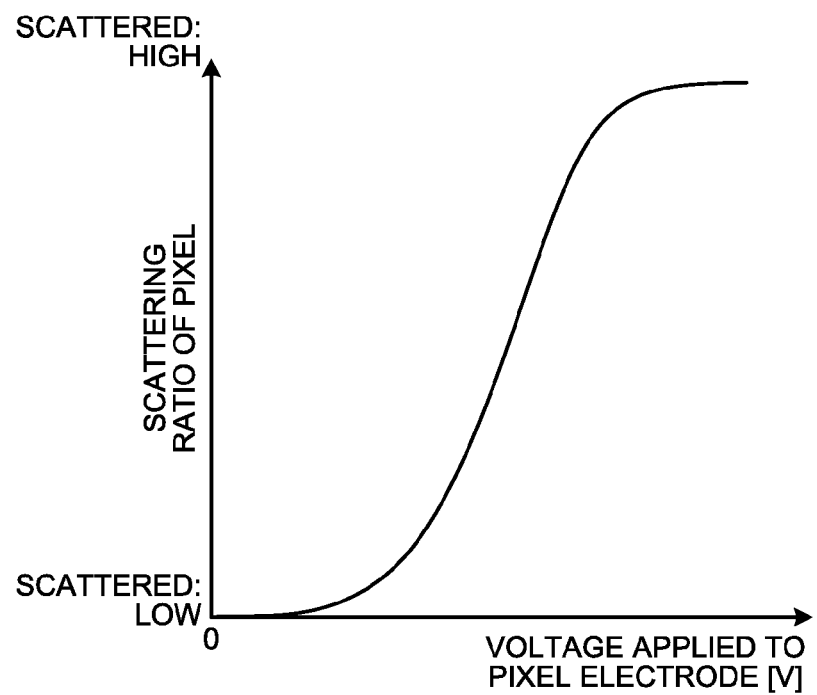
FIG. 4 is an explanatory diagram illustrating a relation between a voltage applied to a pixel electrode and a scattering state of a pixel.
Figure 6:
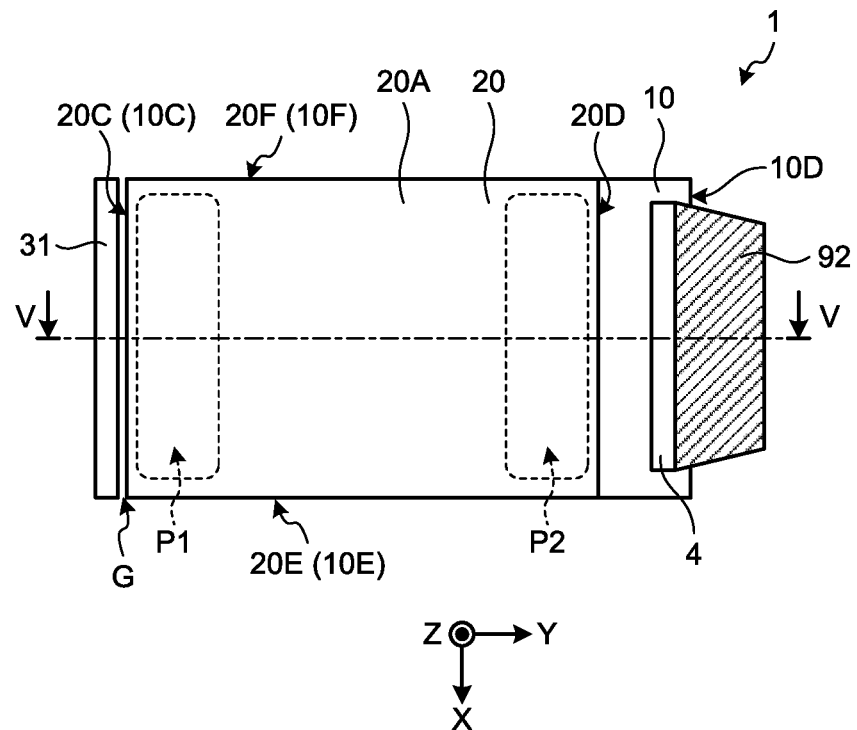
FIG. 6 is a plan view illustrating a plane of the display apparatus of FIG. 1.
Figure 7:
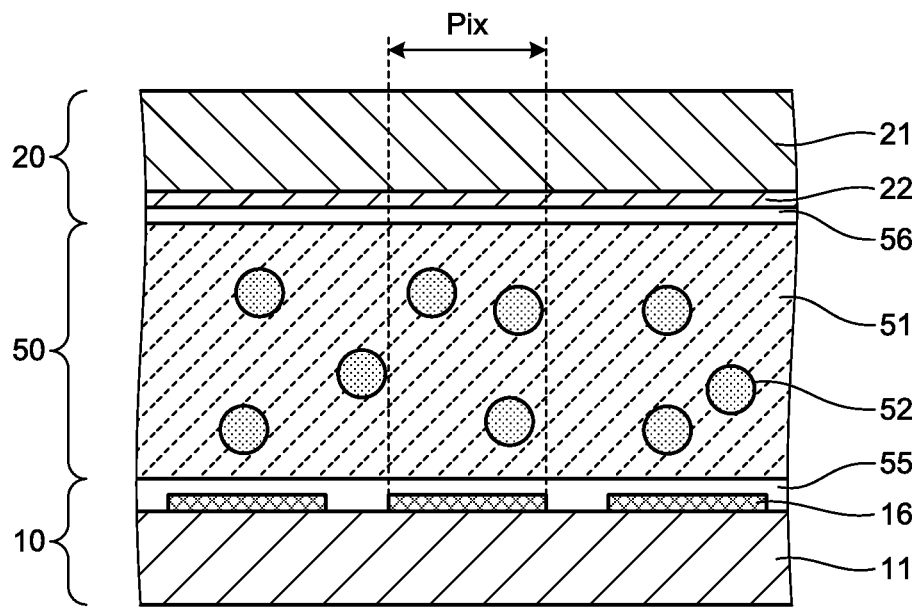
FIG. 7 is an enlarged cross-sectional view of a liquid crystal layer section of FIG. 5.
Figure 8:
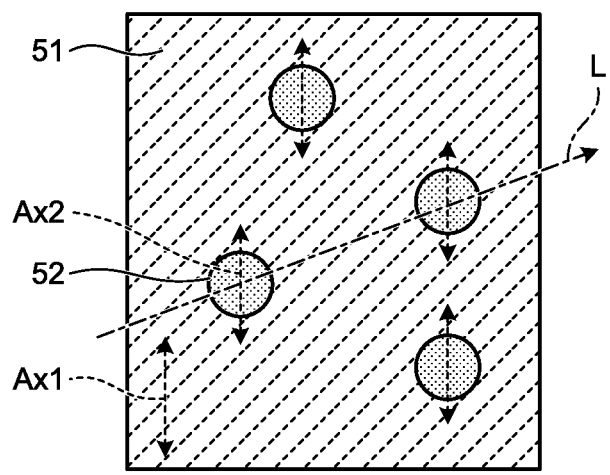
FIG. 8 is a cross-sectional view for explaining a non-scattering state in a liquid crystal layer.
Figure 9:
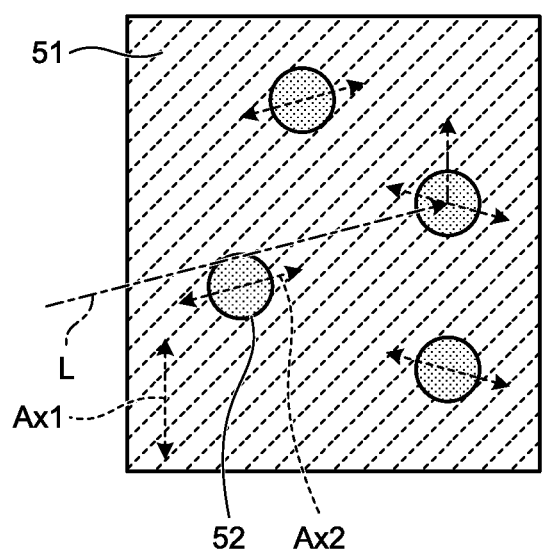
FIG. 9 is a cross-sectional view for explaining a scattering state in the liquid crystal layer.

FIG. 4 is an explanatory diagram illustrating a relation between a voltage applied to a pixel electrode and a scattering state of a pixel. FIG. 5 is a cross-sectional view illustrating an example of a cross-section of the display apparatus of FIG. 1. FIG. 6 is a plan view illustrating a plane of the display apparatus of FIG. 1. FIG. 5 is a cross-sectional view taken along line V-V illustrated in FIG. 6. FIG. 7 is an enlarged cross-sectional view of a liquid crystal layer section of FIG. 5. FIG. 8 is a cross-sectional view for explaining a non-scattering state in a liquid crystal layer. FIG. 9 is a cross-sectional view for explaining a scattering state in the liquid crystal layer.

If a gradation signal according to the output gradation value of each of the pixels Pix selected within the one vertical scanning period GateScan is supplied to each of the above-described signal lines 13, a voltage applied to the pixel electrode 16 is changed according to the gradation signal. If the voltage applied to the pixel electrode 16 is changed, a voltage between the pixel electrode 16 and the common electrode 22 is changed. Then, as illustrated in FIG. 4, the scattering state of the liquid crystal layer 50 of each pixel Pix is controlled, and the scattering ratio of the pixel Pix is changed, according to the voltage applied to the pixel electrode 16.

As illustrated in FIGS. 5 and 6, the first light-transmissive substrate 10 includes a first principal surface 10A, a second principal surface 10B, a first side surface 10C, a second side surface 10D, a third side surface 10E, and a fourth side surface 10F. The first principal surface 10A and the second principal surface 10B are planes parallel to each other. The first side surface 10C and the second side surface 10D are planes parallel to each other. The third side surface 10E and the fourth side surface 10F are planes parallel to each other.

As illustrated in FIGS. 5 and 6, the second light-transmissive substrate 20 includes a first principal surface 20A, a second principal surface 20B, a first side surface 20C, a second side surface 20D, a third side surface 20E, and a fourth side surface 20F. The first principal surface 20A and the second principal surface 20B are planes parallel to each other. The first side surface 20C and the second side surface 20D are planes parallel to each other. The third side surface 20E and the fourth side surface 20F are planes parallel to each other.

As illustrated in FIGS. 5 and 6, the light-emitting device 31 faces the first side surface 20C of the second light-transmissive substrate 20. As illustrated in FIG. 5, the light-emitting device 31 emits light source light L to the first side surface 20C of the second light-transmissive substrate 20. The first side surface 20C, which faces the light-emitting device 31, of the second light-transmissive substrate 20 serves as a light incident surface. A gap G is provided between the light-emitting device 31 and the light incident surface. The gap G serves as an air layer.

As illustrated in FIG. 5, the light source light L emitted from the light-emitting device 31 propagates in a direction away from the first side surface 20C while being reflected at the first principal surface 10A of the first light-transmissive substrate 10 and the first principal surface 20A of the second light-transmissive substrate 20. When the light source light L travels from the first principal surface 10A of the first light-transmissive substrate 10 or the first principal surface 20A of the second light-transmissive substrate 20 toward the outside, the light source light travels from a medium having a high refractive index to a medium having a low refractive index. Accordingly, if an incident angle of the light source light L entering the first principal surface 10A of the first light-transmissive substrate 10 or the first principal surface 20A of the second light-transmissive substrate 20 is larger than a critical angle, the light source light L is totally reflected at the first principal surface 10A of the first light-transmissive substrate 10 or the first principal surface 20A of the second light-transmissive substrate 20.

As illustrated in FIG. 5, the light source light L propagating through the inside of the first light-transmissive substrate 10 and that of the second light-transmissive substrate 20 is scattered in the pixel Pix having a liquid crystal in the scattering state, and the incident angle of the scattered light becomes smaller than the critical angle. Radiant light 68 and radiant light 68A are respectively radiated from the first principal surface 20A of the second light-transmissive substrate 20 and the first principal surface 10A of the first light-transmissive substrate 10 to the outside. The radiant light 68 and the radiant light 68A radiating respectively from the first principal surface 20A of the second light-transmissive substrate 20 and the first principal surface 10A of the first light-transmissive substrate 10 to the outside are observed by an observer. In the present disclosure, a value representing the degree of luminance of the radiant light 68 or the radiant light 68A in the pixel Pix will be referred to as a radiance gradation value. The following describes polymer dispersed liquid crystal in the scattering state and polymer dispersed liquid crystal in the non-scattering state with reference to FIGS. 7 to 9.

As illustrated in FIG. 7, a first orientation film 55 is arranged in the first light-transmissive substrate 10. A second orientation film 56 is arranged in the second light-transmissive substrate 20. The first orientation film 55 and the second orientation film 56 are, for example, vertical orientation films.

A solution in which liquid crystal is dispersed in monomers is sealed between the first light-transmissive substrate 10 and the second light-transmissive substrate 20. Next, the monomers are polymerized by ultraviolet rays or heat in a state where the monomers and the liquid crystal are oriented by the first orientation film 55 and the second orientation film 56 to form a bulk 51. This process forms the liquid crystal layer 50 including the polymer dispersed liquid crystal in a reverse mode in which the liquid crystal is dispersed in gaps of a polymer network formed in a mesh manner.

In this way, the liquid crystal layer 50 includes the bulk 51 formed of the polymer, and a plurality of fine particles 52 dispersed in the bulk 51. The fine particles 52 are formed of the liquid crystal. The bulk 51 and the fine particles 52 each have optical anisotropy.

The orientation of the liquid crystal included in the fine particles 52 is controlled based on a voltage difference between the pixel electrode 16 and the common electrode 22. The orientation of the liquid crystal is changed according to a voltage applied to the pixel electrode 16. The degree of scattering of the light that passes through the pixel Pix is changed in accordance with the change of the orientation of the liquid crystal.

For example, as illustrated in FIG. 8, in a state in which no voltage is applied between the pixel electrode 16 and the common electrode 22, the direction of the optical axis Ax1 of the bulk 51 and the direction of the optical axis Ax2 of the fine particles 52 are the same. The optical axis Ax2 of the fine particles 52 is parallel to the Z direction of the liquid crystal layer 50. The optical axis Ax1 of the bulk 51 is parallel to the Z direction of the liquid crystal layer 50 regardless of whether or not a voltage is applied thereto.

An ordinary light refractive index of the bulk 51 and that of the fine particles 52 are equal to each other. In a state in which no voltage is applied between the pixel electrode 16 and the common electrode 22, a difference in the refractive indexes between the bulk 51 and the fine particles 52 becomes zero in all directions. The liquid crystal layer 50 becomes the non-scattering state in which the liquid crystal layer 50 does not scatter the light source light L. The light source light L propagates in a direction away from the light-emitting device 31 while being reflected at the first principal surface 10A of the first light-transmissive substrate 10 and the first principal surface 20A of the second light-transmissive substrate 20. When the liquid crystal layer 50 is in the non-scattering state in which the liquid crystal layer 50 does not scatter the light source light L, a background on the first principal surface 20A side of the second light-transmissive substrate 20 is visually recognized from the first principal surface 10A of the first light-transmissive substrate 10, and a background on the first principal surface 10A side of the first light-transmissive substrate 10 is visually recognized from the first principal surface 20A of the second light-transmissive substrate 20.

As illustrated in FIG. 9, the optical axis Ax2 of the fine particle 52 is inclined by an electric field generated between the pixel electrode 16 and the common electrode 22 to which a voltage is applied. Since the optical axis Ax1 of the bulk 51 remains unchanged by the electric field, the direction of the optical axis Ax1 of the bulk 51 and the direction of the optical axis Ax2 of the fine particles 52 are different from each other. The light source light L is scattered in the pixel Pix having the pixel electrode 16 to which a voltage is applied. As described above, a part of the scattered light source light L that is radiated from the first principal surface 10A of the first light-transmissive substrate 10 or the first principal surface 20A of the second light-transmissive substrate 20 to the outside is observed by an observer.

In the pixel Pix having the pixel electrode 16 to which no voltage is applied, the background on the first principal surface 20A side of the second light-transmissive substrate 20 is visually recognized from the first principal surface 10A of the first light-transmissive substrate 10, and the background on the first principal surface 10A side of the first light-transmissive substrate 10 is visually recognized from the first principal surface 20A of the second light-transmissive substrate 20. In the display apparatus 1 according to the configurational embodiment, when an image input signal VS is input from the image output device 91, a voltage is applied to the pixel electrode 16 of the pixel Pix displaying an image, and the image in accordance with the image input signal VS is visually recognized together with the background.

The image displayed according to the light source light L scattered and radiated to the outside in the pixel Pix having the pixel electrode 16 to which a voltage is applied superimposes the background to be displayed. In other words, the display apparatus 1 according to the configurational embodiment displays the image superimposing the background by combining the radiant light 68 or the radiant light 68A with the background.

Figure 10:
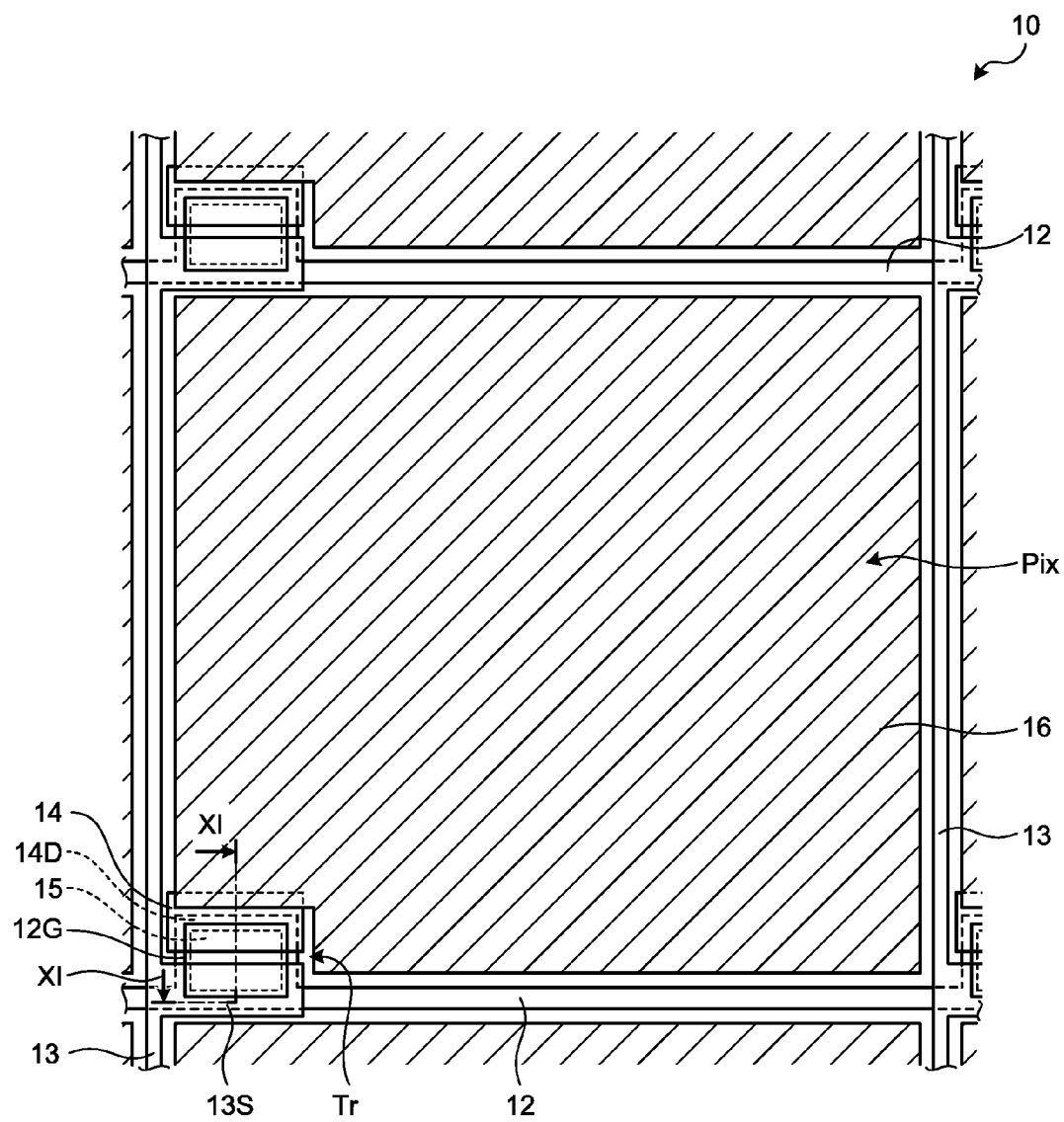
FIG. 10 is a plan view illustrating a pixel.
Figure 11:
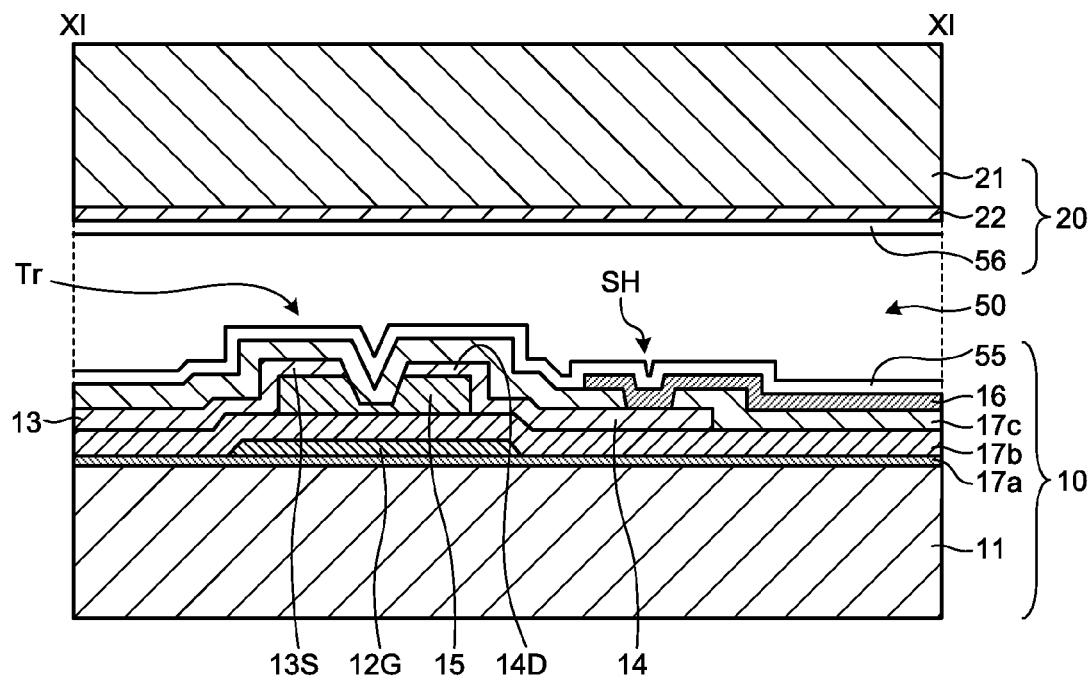
FIG. 11 is a cross-sectional view taken along line XI-XI illustrated in FIG. 10.

FIG. 10 is a plan view illustrating a pixel. FIG. 11 is a cross-sectional view taken along line XI-XI illustrated in FIG. 10. As illustrated in FIGS. 1, 2, and 10, the first light-transmissive substrate 10 is provided with the signal lines 13 and the scanning lines 12 in a grid manner in plan view. A region surrounded by adjacent scanning lines 12 and adjacent signal lines 13 is the pixel Pix. The pixel Pix is provided with the pixel electrode 16 and the switching element Tr. In the configurational embodiment, the switching element Tr is a bottom gate thin film transistor. The switching element Tr includes a semiconductor layer 15 that overlaps a gate electrode 12G electrically coupled to the scanning line 12 in plan view.

The scanning line 12 is wiring made of a metal such as molybdenum (Mo) and aluminum (Al), a layered body of the aforementioned metal, or an alloy of the aforementioned metal. The signal line 13 is wiring made of a metal such as aluminum, or an alloy.

The semiconductor layer 15 is arranged not to protrude from the gate electrode 12G in plan view. This configuration causes the light source light L traveling from the gate electrode 12G side toward the semiconductor layer 15 to be reflected, and is less likely to cause leakage of light in the semiconductor layer 15.

As illustrated in FIG. 10, a source electrode 13S electrically coupled to the signal line 13 overlaps one end portion of the semiconductor layer 15 in plan view.

As illustrated in FIG. 10, a drain electrode 14D is provided in a position adjacent to the source electrode 13S across a central portion of the semiconductor layer 15 in plan view. The drain electrode 14D overlaps the other end portion of the semiconductor layer 15 in plan view. A portion of the semiconductor layer 15 not overlapping the source electrode 13S and the drain electrode 14D functions as a channel of the switching element Tr. As illustrated in FIG. 11, conductive wiring 14 coupled to the drain electrode 14D is electrically coupled to the pixel electrode 16 through a through hole SH.

As illustrated in FIG. 11, the first light-transmissive substrate 10 includes a first base member 11 formed of glass, for example. The first base member 11 may be a resin such as polyethylene terephthalate as long as the resin has light-transmissive properties. A first insulating layer 17a is provided on the first base member 11, and the scanning line 12 and the gate electrode 12G are provided on the first insulating layer 17a. A second insulating layer 17b is provided to cover the scanning line 12. The first insulating layer 17a and the second insulating layer 17b are formed of a transparent inorganic insulating member such as silicon nitride.

The semiconductor layer 15 is stacked on the second insulating layer 17b. The semiconductor layer 15 is formed of amorphous silicon. However, the semiconductor layer 15 may be formed of polysilicon or an oxide semiconductor.

The source electrode 13S that covers a part of the semiconductor layer 15, the signal line 13, the drain electrode 14D that covers a part of the semiconductor layer 15, and the conductive wiring 14 are provided on the second insulating layer 17b. The signal line 13 and the drain electrode 14D are formed of the same material. A third insulating layer 17c is provided on the semiconductor layer 15, the signal line 13, and the drain electrode 14D. The third insulating layer 17c is formed of a transparent inorganic insulating member such as silicon nitride.

The pixel electrode 16 is provided on the third insulating layer 17c. The pixel electrode 16 is formed of a light-transmissive conductive member such as indium tin oxide (ITO). The pixel electrode 16 is electrically coupled to the conductive wiring 14 and the drain electrode 14D through a contact hole provided in the third insulating layer 17c. The first orientation film 55 is provided on the pixel electrode 16.

The second light-transmissive substrate 20 includes a second base member 21 formed of glass, for example. The second base member 21 may be a resin such as polyethylene terephthalate as long as the resin has light-transmissive properties. The common electrode 22 is provided on the second base member 21. The common electrode 22 is formed of a light-transmissive conductive member such as ITO. The second orientation film 56 is provided on the surface of the common electrode 22.

Figure 12:
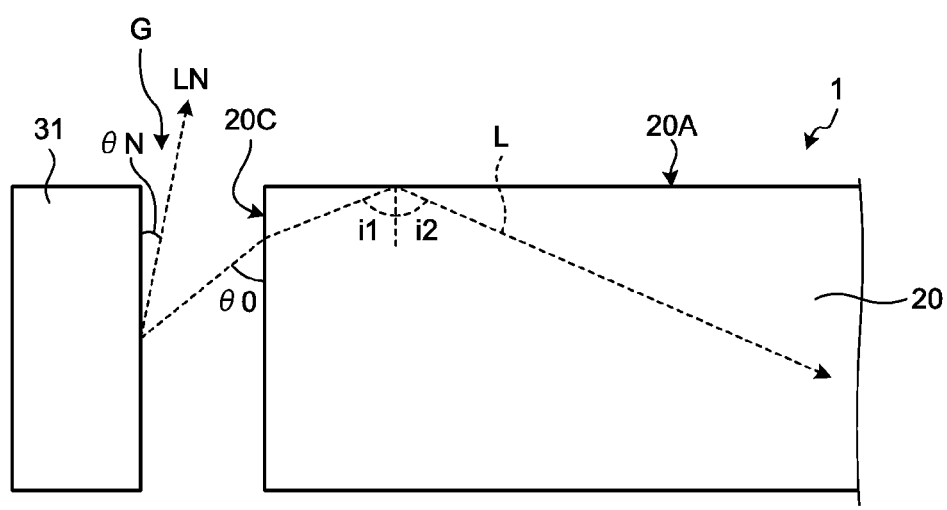
FIG. 12 is a diagram for explaining incident light from a light-emitting device.

FIG. 12 is a diagram illustrating incident light incident from the light-emitting device. When light from the light-emitting device 31 enters the first side surface 20C of the second light-transmissive substrate 20 at an angle θ0, the light enters the first principal surface 20A of the second light-transmissive substrate 20 at an angle i1. In a case where the angle i1 is larger than the critical angle, the light source light L totally reflected at the first principal surface 20A of the second light-transmissive substrate 20 at an angle i2 propagates through the inside of the second light-transmissive substrate 20. Since the gap G is formed between the light-emitting device 31 and the first side surface 20C (light incident surface) illustrated in FIG. 12, light source light LN having an angle θN by which the angle i1 becomes smaller than the critical angle is not guided to the first side surface 20C of the second light-transmissive substrate 20.

First Embodiment

Figure 13:
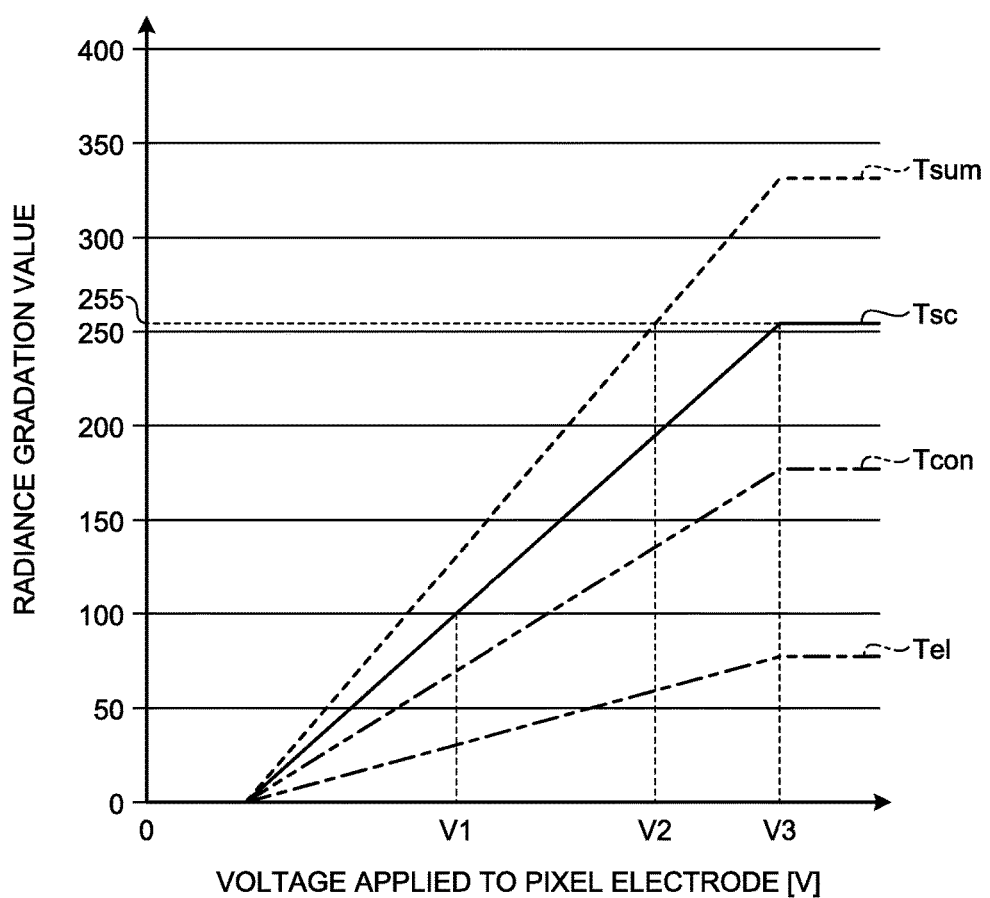
FIG. 13 is a diagram for explaining the influence of external light on radiance in a pixel.

FIG. 13 is a diagram for explaining the influence of external light on radiance in a pixel. As illustrated in FIG. 4, the scattering ratio of a pixel Pix increases according to a voltage applied to a pixel electrode. For this reason, as illustrated in FIG. 13, when a voltage applied to the pixel electrode increases in the order of a voltage V1, a voltage V2, and a voltage V3, a radiance gradation value according to light source light increases in the order of the voltage V1, the voltage V2, and the voltage V3 applied to the pixel electrode along a first characteristic graph Tsc. In a state in which no external light is incident on a display panel 2, a gradation value of luminance of the light source light is the radiance gradation value. The first characteristic graph Tsc indicates that a radiance gradation value according to the light source light when the voltage V3 is applied to the pixel electrode is "255", which is the maximum value of the 8-bit gradation. In the state in which no external light is incident on the display panel 2, the first characteristic graph Tsc indicates that the radiance gradation value does not reach "255" when the voltage V1 or the voltage V2 is applied to the pixel electrode.

As a comparative example, a transmissive liquid crystal panel having an ordinary backlight needs to make an image brighter as external light entering the panel becomes stronger, which requires increase in output of the backlight. On the other hand, the display apparatus 1 according to the configurational embodiment includes no backlight. Thus, in the display apparatus 1 according to the configurational embodiment, when external light is incident on the display panel 2, the external light is scattered in the pixel Pix in accordance with a voltage applied to the pixel Pix, and is emitted as radiant light 68. A display apparatus 1 according to a first embodiment can perform display using external light, and thus can reduce the output of a light-emitting device.

In a state in which external light is incident on the display panel 2, when a voltage applied to the pixel electrode illustrated in FIG. 13 increases in the order of the voltage V1, the voltage V2, and the voltage V3 applied to the pixel electrode, a radiance gradation value according to the external light increases in the order of the voltage V1, the voltage V2, and the voltage V3 applied to the pixel electrode along a second characteristic graph Tel. In a state in which external light is incident on the display panel 2, a total sum of a radiance gradation value according to the light source light and a radiance gradation value according to the external light is the gradation value of the light amount of the radiant light. In other words, in a state in which external light is incident on the display panel 2, radiance gradation values with respect to the voltage V1, the voltage V2, and the voltage V3 applied to the pixel electrode are along a fourth characteristic graph Tsum.

For example, the first characteristic graph Tsc indicates that a radiance gradation value according to the light source light when the voltage V2 is applied to the pixel electrode is smaller than "255", which is the maximum value of the 8-bit gradation. On the other hand, the fourth characteristic graph Tsum indicates that a radiance gradation value corresponding to the voltage V2 applied to the pixel electrode exceeds "255". In this way, the gradation value of the light amount of the radiant light is larger than the radiance gradation value according to the light source light. For this reason, an unintended color, which is different from a color of each pixel required to display an image in accordance with an image input signal VS, may be displayed on the display panel 2.

In order to prevent a decrease in recognizability due to the color shift, the amount of light emitted by the light-emitting device 31 may be increased. However, this increase in amount of light emitted by the light-emitting device 31 may increase power consumption of the display apparatus 1.

Further, in a state in which external light is incident on the display panel 2, the light source light L and the external light are scattered, and the radiant light 68 can be visually recognized from the outside of the display panel 2. As a result, an image displayed on the display panel 2 is brighter than an image in accordance with the image input signal VS, which makes it hard for the background to be visually recognized. Furthermore, in the image displayed on the display panel 2, there may be an increased number of the pixels Pix with the radiance gradation values exceeding "255", so that a chunk of a high-luminance image may tend to be displayed, which may be visually recognized as luminance unevenness. In addition, in a state in which external light is incident on the display panel 2, recognizability of an image having a small luminance difference between the pixels Pix may be decreased.

In order to solve the above mentioned problem, a storage 413 stores information of the first characteristic graph Tsc and information of the second characteristic graph Tel as lookup tables, according to the first embodiment. An external light analyzer 412 calculates the second characteristic graph Tel according to a signal ELV of external light intensity information supplied from an external light setting device 61 described above, and generates an adjustment signal LAS based on this second characteristic graph Tel. A signal adjuster 414 calculates a radiance gradation value for each of the predetermined voltages applied to the pixel electrodes and generates a third characteristic graph Tcon by subtracting the radiance gradation value of the second characteristic graph Tel from the radiance gradation value of the first characteristic graph Tsc. The signal adjuster 414 generates a light source control signal LCSA for decreasing the light emission amount of the light-emitting device 31 such that the radiance gradation value for each of the predetermined voltages applied to the pixel electrode is along the third characteristic graph Tcon.

A light source controller 32 drives the light-emitting device 31 in accordance with the light source control signal LCSA. As a result, each radiance gradation value according to the light source light for each of the voltage V1, the voltage V2, and the voltage V3 is along the third characteristic graph Tcon, as illustrated in FIG. 13. In a state in which external light is incident on the display panel 2, a total sum of the radiance gradation value according to the light source light and the radiance gradation value according to the external light is along the first characteristic graph Tsc.

The present embodiment allows a color of each pixel required for displaying an image in accordance with the image input signal VS to be easily displayed, even in a case where external light is incident on the display panel 2 according to the configurational embodiment. For this reason, the present embodiment can prevent a decrease in recognizability of the display panel 2, without increasing the amount of light emitted by the light-emitting device 31. Further, decreasing the amount of light emitted by the light-emitting device 31 can reduce power consumption of the display apparatus 1.

Furthermore, the present embodiment decreases a luminance difference between an image displayed on the display panel 2 and an image in accordance with the image input signal VS, thereby improving a luminance balance between the image and the background. As a result, the present embodiment improves the recognizability of the image displayed on the display panel 2. The present embodiment reduces the number of pixels Pix having radiance gradation values exceeding "255" in an image displayed on the display panel 2, so that a chunk of a high-luminance image is hardly displayed, thereby suppressing luminance unevenness. Furthermore, the present embodiment also allows an image having a small luminance difference between pixels Pix to be visually recognized with ease in a state in which external light is incident on the display panel 2, thereby improving the recognizability of the image displayed on the display panel 2.

A display controller 5 generates the light source control signal LCSA from a light source control signal LCS in accordance with the adjustment signal LAS. The present embodiment thus decreases the amount of light emitted by the light-emitting device 31 according to the signal ELV of the external light intensity information. In this way, the display controller 5 performs control so as to reduce the power consumption of the light-emitting device 31 according to the signal ELV of the external light intensity information supplied from the external light setting device 61. The display apparatus 1 can thus reduce its power consumption.

Second Embodiment

Figure 14:
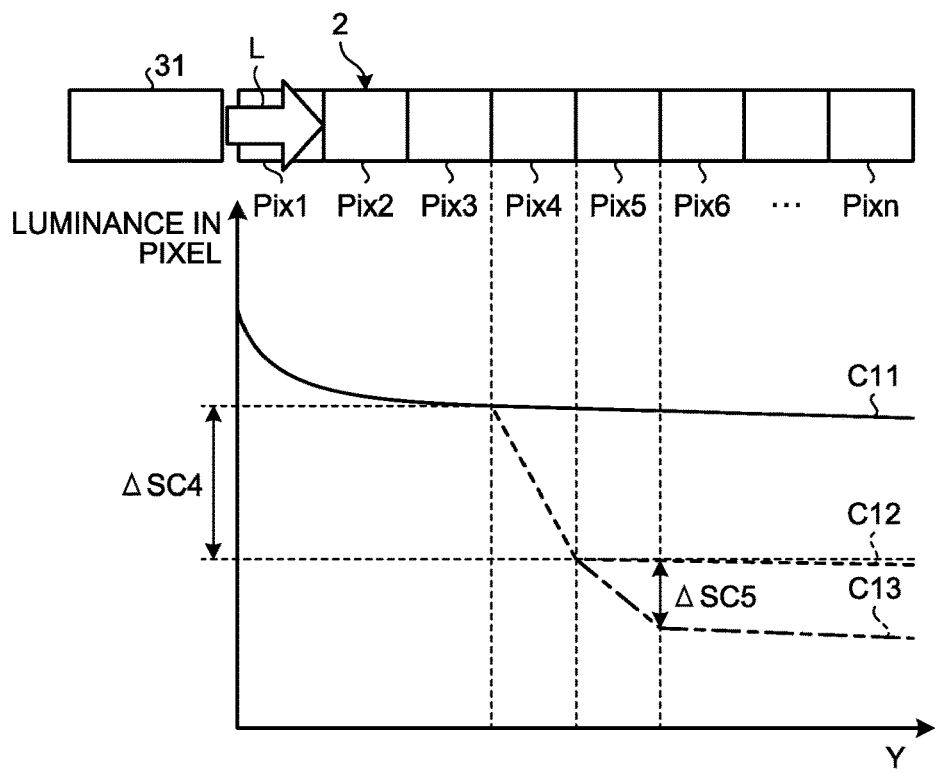
FIG. 14 is a diagram for explaining a relation between a distance from the light-emitting device to each pixel and radiance in a state in which no external light is incident on a display panel.
Figure 15:
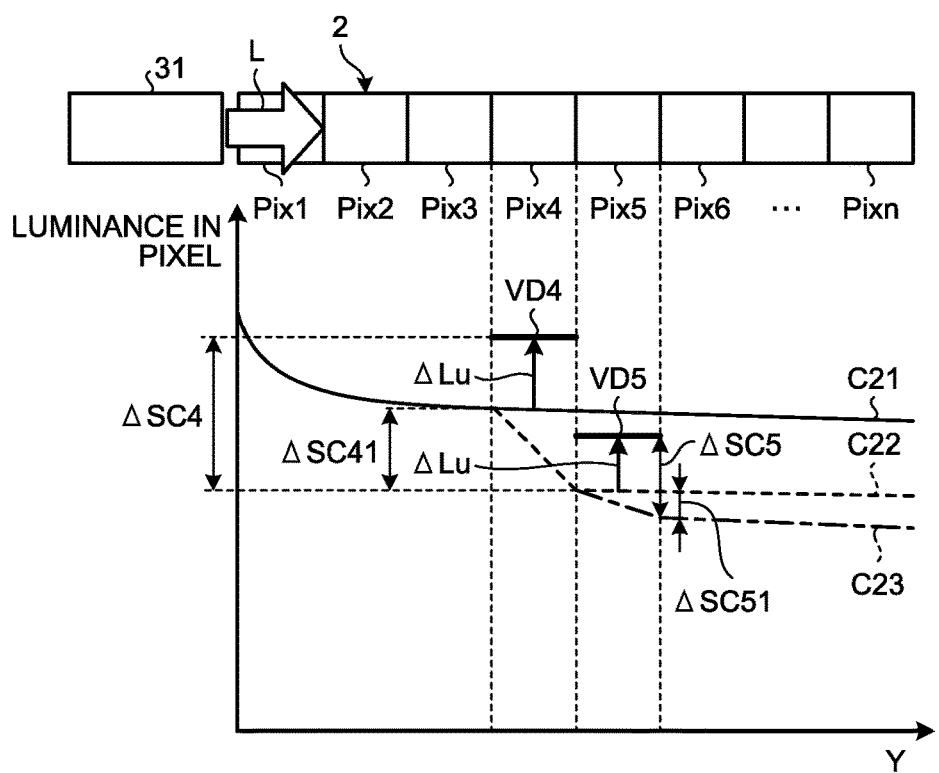
FIG. 15 is a diagram for explaining a relation between a distance from the light-emitting device to each pixel and radiance in a state in which external light is incident on the display panel.

FIG. 14 is a diagram for explaining a relation between a distance from a light-emitting device and radiance in a state in which no external light is incident on a display panel. FIG. 15 is a diagram for explaining a relation between a distance from the light-emitting device and radiance in a state in which external light is incident on the display panel. The same configuration elements as those described in the configurational embodiment are denoted with the same reference signs, and overlapping description is omitted.

In FIGS. 14 and 15, pixels Pix1, Pix2, Pix3, Pix4, Pix5, Pix6, . . . , Pixn are arranged in an X direction. Light source light L entering from a light-emitting device 31 travels through the pixel Pix1 toward Pixn.

As illustrated in FIG. 14, in a state in which no external light is incident on a display panel 2, when no voltage is applied to any of pixel electrodes of the pixels Pix1, Pix2, Pix3, Pix4, Pix5, Pix6, . . . , Pixn, a graph C11 represents a relation between a distance from the light-emitting device 31 to each pixel Pix in a Y direction, and luminance in each pixel Pix. In a state in which no external light is incident on the display panel 2, when a voltage is applied only to the pixel electrode of the pixel Pix4, a graph C12 represents a relation between a distance from the light-emitting device 31 to each pixel Pix in the Y direction, and luminance in each pixel Pix. Furthermore, in a state in which no external light is incident on the display panel 2, when a voltage is applied only to the pixel electrodes of the pixel Pix4 and the pixel Pix5, a graph C13 represents a relation between a distance from the light-emitting device 31 to each pixel Pix in the Y direction, and luminance in each pixel Pix.

As illustrated in FIG. 14, when a voltage is applied to the pixel electrode of the pixel Pix4, light source light L propagating through the inside of a first light-transmissive substrate 10 and that of a second light-transmissive substrate 20 is scattered in the pixel Pix4, and the luminance of the light source light L decreases by ΔSC4. Further, when a voltage is applied to the pixel electrode of the pixel Pix5, the light source light L that has propagated through the inside of the first light-transmissive substrate 10 and that of the second light-transmissive substrate 20 is scattered in the pixel Pix5 having liquid crystal in a scattering state, and the luminance of the light source light L decreases by ΔSC5.

As illustrated in FIG. 15, in a state in which no external light is incident on the display panel 2, when no voltage is applied to any of pixel electrodes of the pixels Pix1, Pix2, Pix3, Pix4, Pix5, Pix6, . . . , Pixn, a graph C21 represents a relation between a distance from the light-emitting device 31 to each pixel Pix in the Y direction, and luminance in each pixel Pix. As illustrated in FIG. 15, in a state in which external light 69 is incident on the display panel 2, when a voltage is applied only to the pixel electrode of the pixel Pix4, a graph C22 represents a relation between a distance from the light-emitting device 31 to each pixel Pix in the Y direction, and luminance in each pixel Pix. Furthermore, in the state in which the external light 69 is incident on the display panel 2, when a voltage is applied only to the pixel electrodes of the pixel Pix4 and the pixel Pix5, a graph C23 represents a relation between a distance from the light-emitting device 31 to each pixel Pix in the Y direction, and luminance in each pixel Pix.

As illustrated in FIG. 15, in a case where the external light 69 is incident on the display panel 2, the luminance in the pixel Pix increases by luminance ΔLu. For this reason, the luminance in the pixel Pix4 becomes luminance VD4. The light source light L and the external light 69 are scattered in the pixel Pix4, and the luminance VD4 of the pixel Pix4 decreases by ΔSC4. As a result, an apparent decrease of the luminance in the pixel Pix4 is merely ΔSC41. As a result, the amount of the light source light L incident on the pixel Pix5, which is located farther from the light-emitting device 31 than the pixel Pix4, increases. Similarly, the luminance in the pixel Pix5 increases by luminance ΔLu by the incidence of the external light 69, and thus the luminance in the pixel Pix5 becomes luminance VDS. The light source light L and the external light 69 are scattered in the pixel Pix5, and the luminance VD5 in the pixel Pix5 decreases by ΔSC5. As a result, an apparent decrease of the luminance in the pixel Pix5 is merely ΔSC51.

Since the light source light L propagates through the inside of the first light-transmissive substrate 10 and that of the second light-transmissive substrates 20, the farther the distance from the light-emitting device 31 is, the greater the amount of attenuation of the light source light L is, as indicated by the graph C11 in FIG. 14 and the graph C21 in FIG. 15. As illustrated in FIG. 6, the external light 69 in the equivalent amount is incident on a region P2 located close to the second side surface 20D and a region P1 located close to the first side surface 20C. Thus, even if the light source light L is attenuated in the region P2 located farther from the light-emitting device 31, the luminance in the pixel Pix increases by the luminance ΔLu, thereby suppressing luminance unevenness within the plane of the display panel 2, and improving luminance evenness within the plane of the display panel 2.

As described above, in a case where the external light 69 is incident on the display panel 2, the luminance in the pixel Pix illustrated in FIG. 15 increases by luminance ΔLu. For this reason, even if the output of the light-emitting device 31 is decreased by the luminance ΔLu, a display apparatus 1 of the second embodiment can acquire the luminance in the pixel Pix in the equivalent amount to the luminance without the external light 69. Thus, the display controller 5 generates a light source control signal LCSA from a light source control signal LCS in accordance with an adjustment signal LAS. Accordingly, the light amount of the light-emitting device 31 is decreased according to a signal ELV of external light intensity information. In this way, the display apparatus 1 according to the second embodiment can perform display using the external light, and thus can reduce its power consumption by decreasing the output of the light-emitting device 31 by the luminance ΔLu.

Third Embodiment

Figure 16:
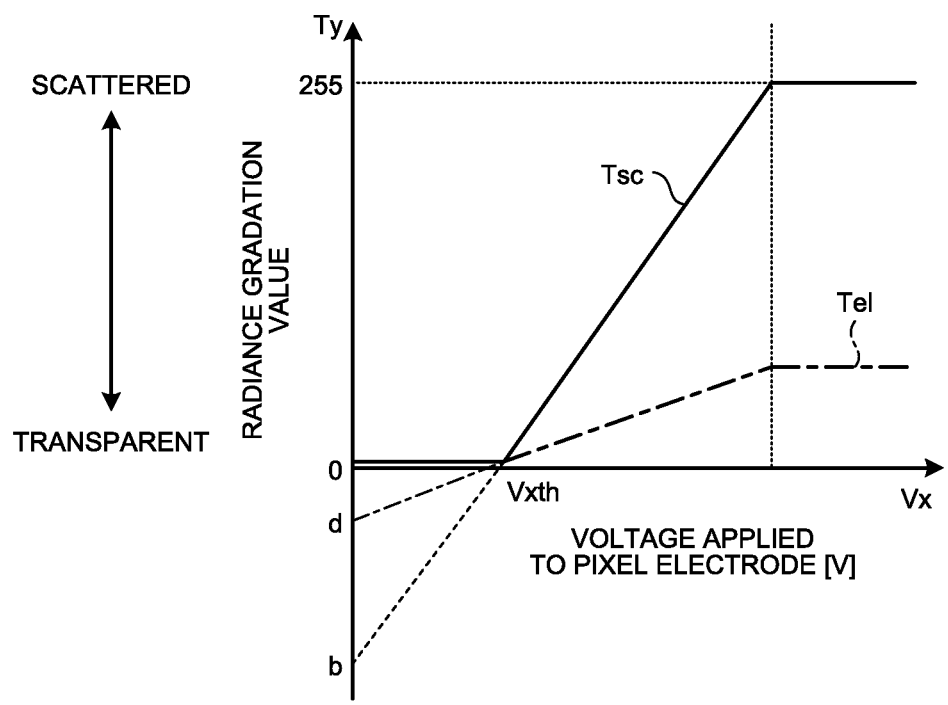
FIG. 16 is a diagram for explaining a lower limit value of a pixel voltage.

FIG. 16 is a diagram for explaining a lower limit value of a pixel voltage. The same configuration elements as those described in the configurational embodiment are denoted with the same reference signs, and overlapping description is omitted. In a region P1 located close to a light-emitting device 31 illustrated in FIG. 6, a sum of a color gradation value of a white component generated by mixing a first color, a second color, and a third color, and a color gradation value of external light 69 exceeds the maximum gradation value, and thus an image displayed on a display panel 2 tends to be whitened.

Thus, a display apparatus of a third embodiment performs control so as to change a voltage applied to a pixel electrode of each pixel Pix in accordance with an signal ELV of external light intensity information, instead of changing the light amount of a light-emitting device 31.

According to the third embodiment, a storage 413 stores, as lookup tables, the information of a first characteristic graph Tsc illustrated in FIG. 13 and the information of a second characteristic graph Tel illustrated in FIG. 13. An external light analyzer 412 calculates the second characteristic graph Tel in accordance with the signal ELV of the external light intensity information supplied from an external light setting device 61, and generates an adjustment signal LAS based on this second characteristic graph Tel. A signal adjuster 414 calculates a fourth characteristic graph Tsum by adding a radiance gradation value of the first characteristic graph Tsc and a gradation value of the second characteristic graph Tel for each of predetermined voltages applied to a pixel electrode.

The signal adjuster 414 calculates a voltage V2 applied to the pixel electrode such that the radiance gradation value is "255" in the fourth characteristic graph Tsum, which is the maximum value of 8-bit gradation. The signal adjuster 414 calculates a voltage V3 applied to the pixel electrode such that the radiance gradation value is "255" in the first characteristic graph Tsc, which is the maximum value of 8-bit gradation.

The signal adjuster 414 illustrated in FIG. 2 generates an image control signal VCSA such that a relation between the voltage applied to the pixel electrode and the radiance gradation value along the first characteristic graph Tsc included in an image control signal VCS becomes a relation between the voltage applied to the pixel electrode and the radiance gradation value along the fourth characteristic graph Tsum. Accordingly, the voltage applied to the pixel electrode of each pixel Pix is changed to be a voltage obtained by multiplying the voltage by V2/V3. The voltage applied to the pixel electrode corresponding to the maximum value of the 8-bit gradation is adjusted from the voltage V3 to the voltage V2 applied to the pixel electrode in FIG. 13. As a result, a display controller 5 decreases the voltage applied to the pixel electrode, which is set based on an image input signal VS, in accordance with the signal ELV of the external light intensity information. In this way, the display controller 5 performs control so as to reduce the power consumption of the display panel 2 according to the signal ELV of the external light intensity information. As a result, the display apparatus 1 can thus reduce its power consumption.

As illustrated in FIG. 16, the first characteristic graph Tsc can be represented by the following Equation (1).

$$Ty = \alpha \times Vx + b \quad (1)$$

In the Equation (1), α and b are determined according to the characteristics of a liquid crystal material, a first light-transmissive substrate 10, and a second light-transmissive substrate 20, for example.

The second characteristic graph Tel can be represented by the following Equation (2).

$$Ty = \beta \times Vx + d \quad (2)$$

In the Equation (2), μ and d are determined according to the characteristics of the liquid crystal material, the first light-transmissive substrate 10, and the second light-transmissive substrate 20, for example, as well as the characteristics of external light. The storage 413 illustrated in FIG. 2 stores the values of μ and d according to the signal ELV of the external light intensity information as a lookup table. The storage 413 may store the values of μ and d according to the signal ELV of the external light intensity information as a function or a database instead of the lookup table. In addition, μ may take discrete values such as 1, 2, 3, ..., p or continuous values.

As described above, the display controller 5 changes the voltage applied to the pixel electrode, which is set based on the image input signal VS, to be a voltage obtained by multiplying the voltage by V2/V3, and decreases the voltage in accordance with the signal ELV of the external light intensity information. In this way, the display controller 5 performs control so as to reduce the power consumption of the drive circuit 4 according to the signal ELV of the external light intensity information.

As illustrated in FIG. 16, when a voltage applied to the pixel electrode becomes a rise application voltage Vxth or higher, the radiance gradation value starts to increase by the external light 69. In a case where the voltage applied to the pixel electrode is lower than the rise application voltage Vxth, the influence of the external light 69 on the display panel 2 is small, and thus the display controller 5 does not need to perform control.

As illustrated in FIG. 16, in a case where the radiance gradation value according to the external light 69 is smaller than the absolute value of d described above in accordance with the signal ELV of the external light intensity information supplied from the external light setting device 61, the influence of the external light 69 on the display panel 2 is small. Thus, the display controller 5 does not need to change the voltage applied to the pixel electrode, which is set based on the image input signal VS, to be a voltage obtained by multiplying the voltage by V2/V3.

The display controller 5 may decrease the amount of light emitted by the light-emitting device 31 as well as decreasing the voltage applied to the pixel electrode, which is set based on the image input signal VS.

Fourth Embodiment

Figure 17:
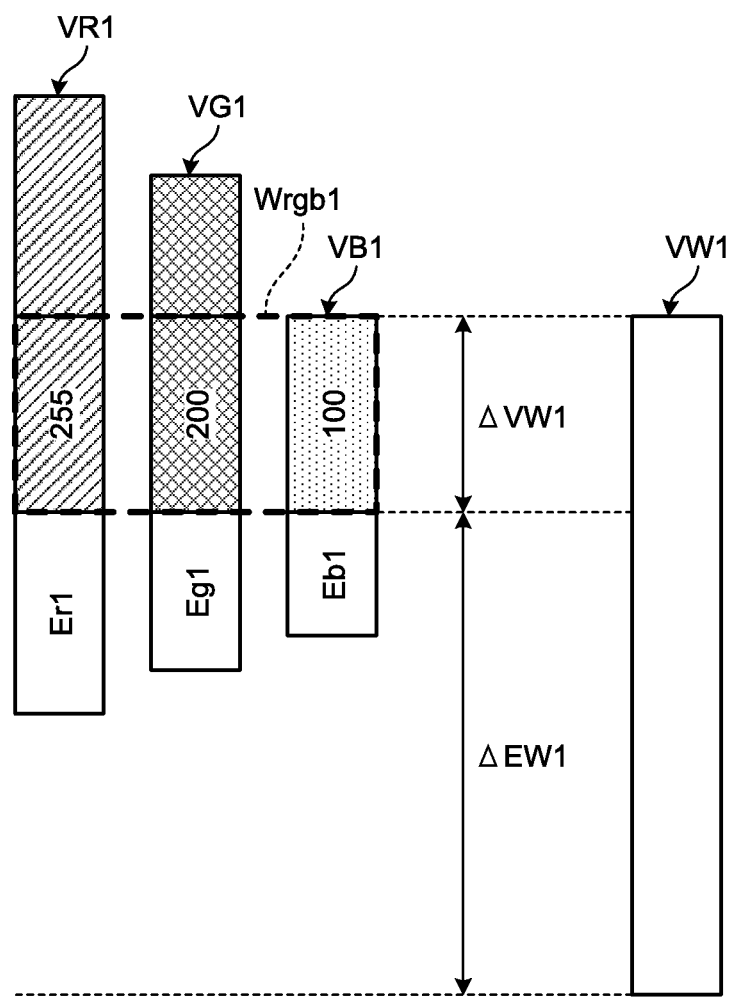
FIG. 17 is an explanatory diagram illustrating an example of a color gradation value of one pixel of an image in accordance with an image input signal.
Figure 18:
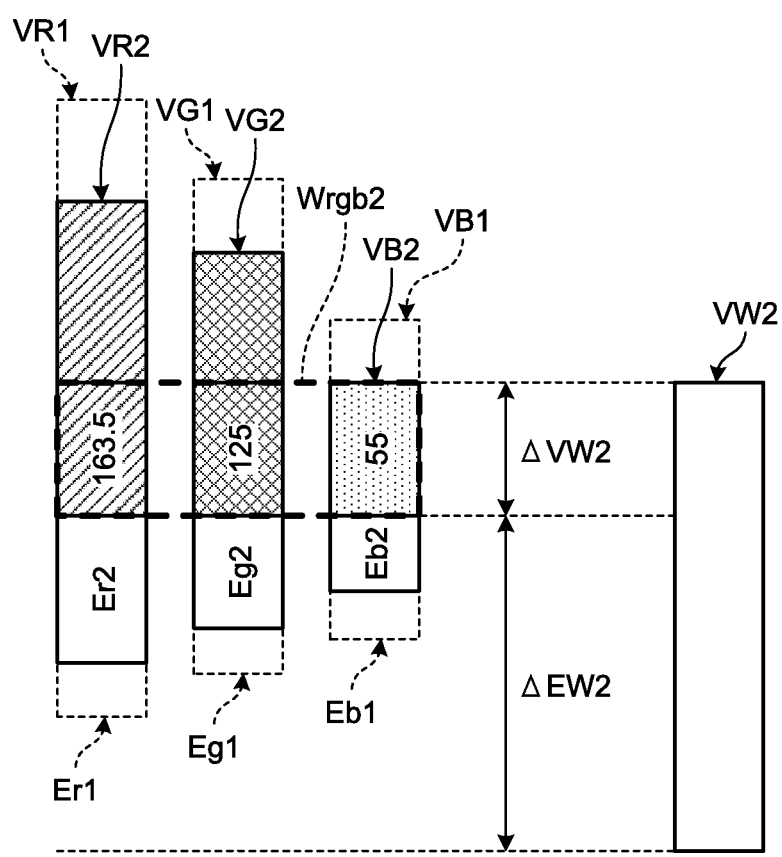
FIG. 18 is an explanatory diagram illustrating an example of a color gradation value of one pixel of an adjusted image according to the configurational embodiment.

FIG. 17 is an explanatory diagram illustrating an example of a color gradation value of one pixel of an image in accordance with an image input signal. FIG. 18 is an explanatory diagram illustrating an example of a color gradation value of one pixel of an adjusted image according to the configurational embodiment. The same configuration elements as those described in the configurational embodiment are denoted with the same reference signs, and overlapping description is omitted.

Changing a voltage applied to a pixel electrode, which is set based on an image input signal VS, changes color gradation values of a first color (R), a second color (G), and a third color (B) of each pixel in accordance with the image input signal VS. The first color (R), the second color (G), the third color (B) respectively correspond to a red component, a green component, and a blue component. A white component generated by mixing the first color (R), the second color (G), and the third color (B) will be referred to as a fourth color in the present disclosure.

As illustrated in FIG. 17, a color gradation value VR1 of the first color is "255", a color gradation value VG1 of the second color is "200", and a color gradation value VB1 of the third color is "100". External light 69 brightens a display panel 2 similarly to the fourth color. A color gradation value ΔEW1 of the external light 69 acquired from a signal ELV of external light intensity information, for example, is "166.5". The display panel 2 is driven by the field sequential method, the color gradation value ΔEW1 of the external light is prorated according to the respective magnitudes of the color gradation value VR1 of the first color, the color gradation value VG1 of the second color, and the color gradation value VB1 of the third color so as to obtain external light color gradation values Er1, Eg1, and Eb1. The color gradation value ΔVW1 of the white component Wrgb1 generated by mixing the first color, the second color, and the third color is "100". A sum of the color gradation value ΔVW1 and the color gradation value ΔEW1 exceeds the maximum gradation value "255", which makes it difficult to visually recognize a gradation difference among the first color, the second color, and the third color of the pixel Pix. As a result, the pixel Pix is represented only as the fourth color.

As illustrated in FIG. 18, a signal adjuster 414 generates an image control signal VCSA from an image control signal VCS in accordance with an adjustment signal LAS, and decreases a voltage applied to the pixel electrode by 30%, for example. In other words, the voltage ratio (V2/V3) of a voltage V2 to a voltage V3 illustrated in FIG. 13 is 7/10, and a display controller 5 performs control to display a pixel Pix with a voltage applied to the pixel electrode, the voltage being obtained by multiplying an application voltage for the pixel electrode set based on the image input signal VS by the voltage ratio (V2/V3).

As illustrated in FIG. 18, a color gradation value VR2 of the first color is "163.5". A color gradation value VG2 of the second color is "125". A color gradation value VB2 of the third color is "55". As a result, a color gradation value ΔEW2 of the external light is decreased to be "103.5". The color gradation value ΔEW2 of the external light 69 is prorated according to the respective magnitudes of the color gradation value VR2 of the first color, the color gradation value VG2 of the second color, and the color gradation value VB2 of the third color so as to obtain external light color gradation values Er2, Eg2, and Eb2. The color gradation value ΔVW2 of a white component Wrgb2 generated by mixing the first color, the second color, and the third color is "55". A sum of the color gradation value ΔVW2 and the color gradation value ΔEW2 is "158.5".

As described above, the image control signal VCSA is generated from the image control signal VCS in accordance with the adjustment signal LAS. For example, in a case where the color gradation value ΔVW1 of a white component generated by mixing the first color, the second color, and the third color, which is set based on the image input signal VS, and the color gradation value ΔEW1 of the external light, which is set based on the signal ELV of the external light intensity information, exceed the maximum gradation value, the display controller 5 decreases a voltage applied to the pixel electrode according to the signal ELV of the external light intensity information. Accordingly, a display apparatus 1 can reduce its power consumption. Further, the present embodiment can improve the luminance according to the color gradation value ΔEW2 of the external light. The present embodiment allows a gradation difference among the first color, the second color, and the third color to be visually recognized, thereby improving the recognizability of an image.

The display apparatus 1 according to the configurational embodiment includes: the first light-transmissive substrate 10; the second light-transmissive substrate 20; the liquid crystal layer 50; the light-emitting device 31; and the display controller 5. The second light-transmissive substrate 20 faces the first light-transmissive substrate 10. The liquid crystal layer 50 includes polymer dispersed liquid crystal sealed between the first light-transmissive substrate 10 and the second light-transmissive substrate 20. The light-emitting device 31 faces the first side surface 20C of the second light-transmissive substrate 20. The display controller 5 performs control so as to reduce its power consumption according to the signal ELV of external light intensity information supplied from the external light setting device 61.

This configuration has no backlight and no reflection plate on the first principal surface 10A side of the first light-transmissive substrate 10 or the first principal surface 20A side of the second light-transmissive substrate 20. For this reason, the background on the first principal surface 20A side of the second light-transmissive substrate 20 is visually recognized from the first principal surface 10A of the first light-transmissive substrate 10, or the background on the first principal surface 10A side of the first light-transmissive substrate 10 is visually recognized from the first principal surface 20A of the second light-transmissive substrate 20.

Further, the display apparatus 1 according to the configurational embodiment has no polarizing plate on the first principal surface 10A side of the first light-transmissive substrate 10 or the first principal surface 20A side of the second light-transmissive substrate 20. For this reason, in a case where the background on the first principal surface 20A side of the second light-transmissive substrate 20 is visually recognized from the first principal surface 10A of the first light-transmissive substrate 10, or the background on the first principal surface 10A side of the first light-transmissive substrate 10 is visually recognized from the first principal surface 20A of the second light-transmissive substrate 20, the configuration realizes high transmittance, thereby allowing the background to be visually recognized with clarity.

Then, the display controller 5 performs control so as to reduce the power consumption of the light-emitting device 31 in accordance with the signal ELV of the external light intensity information supplied from the external light setting device 61. Accordingly, in a state in which external light is incident on the display panel 2, the configuration can improve the recognizability of an image displayed on the display panel 2.

The display apparatus 1 includes the pixel electrode 16 serving as a first electrode and the common electrode 22 serving as a second electrode with the liquid crystal layer 50 interposed therebetween. The display controller 5 decreases a voltage applied to the pixel electrode 16, which is set based on the image input signal VS, in accordance with the signal ELV of the external light intensity information. In this way, the display controller 5 performs control so as to reduce the power consumption of the display panel 2 in accordance with the signal ELV of the external light intensity information supplied from the external light setting device 61. Accordingly, in a state in which external light is incident on the display panel 2, the configuration can improve the recognizability of an image displayed on the display panel 2.

First Modification

Figure 19:
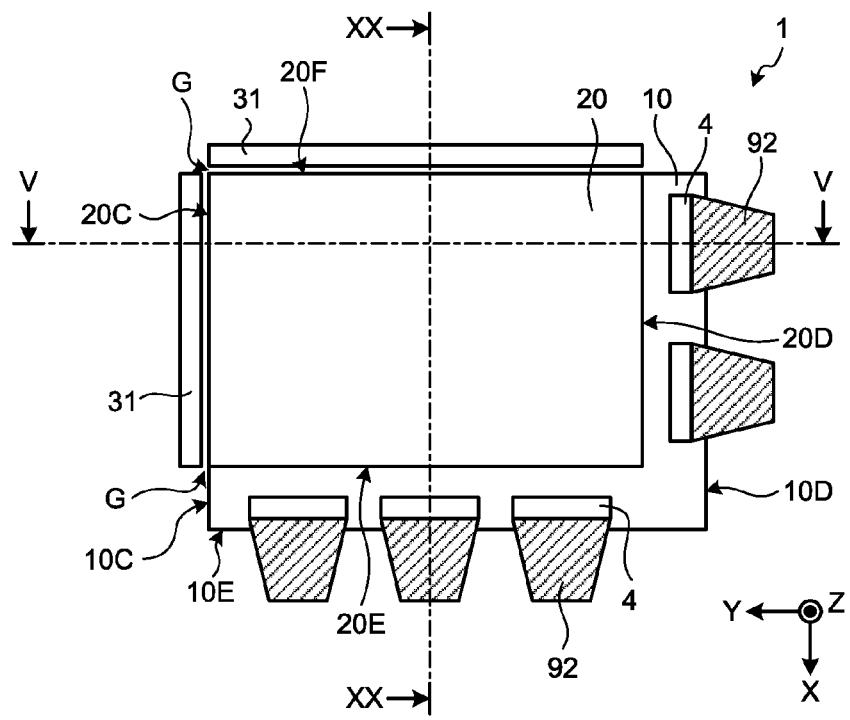
FIG. 19 is a plan view illustrating the plane of a display apparatus according to a first modification of the configurational embodiment.
Figure 20:
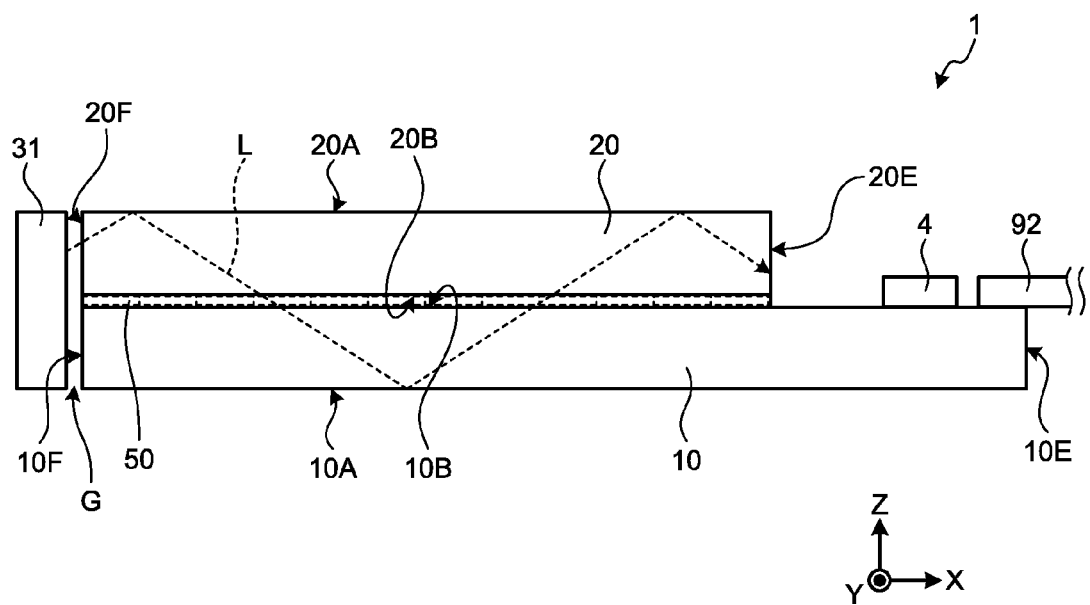
FIG. 20 is a cross-sectional view taken along line XX-XX illustrated in FIG. 19.

FIG. 19 is a plan view illustrating the plane of a display apparatus according to a first modification of the configurational embodiment. FIG. 20 is a cross-sectional view taken along line XX-XX illustrated in FIG. 19. The same configuration elements as those described in the configurational embodiment are denoted with the same reference signs, and overlapping description is omitted. A cross-section taken along line V-V illustrated in FIG. 19 is the same as that of the display apparatus according to the configurational embodiment illustrated in FIG. 5, and overlapping description is omitted.

As illustrated in FIGS. 19 and 20, a light-emitting device 31 faces a fourth side surface 20F of a second light-transmissive substrate 20. As illustrated in FIG. 20, the light-emitting device 31 emits light source light L to the fourth side surface 20F of the second light-transmissive substrate 20. The fourth side surface 20F of the second light-transmissive substrate 20 facing the light-emitting device 31 serves as a light incident surface. A gap G is provided between the light-emitting device 31 and the light incident surface. The gap G serves as an air layer.

As illustrated in FIG. 20, the light source light L emitted from the light-emitting device 31 propagates in a direction away from the fourth side surface 20F while being reflected at a first principal surface 10A of a first light-transmissive substrate 10 and a first principal surface 20A of the second light-transmissive substrate 20.

The display apparatus 1 according to the first modification of the configurational embodiment includes the first light-transmissive substrate 10, the second light-transmissive substrate 20, a liquid crystal layer 50, and light-emitting devices 31. The two light-emitting devices 31 respectively face a first side surface 20C and the fourth side surface 20F of the second light-transmissive substrate 20. The configuration increases the amounts of the light emitted from the two light-emitting devices 31 and propagating through a display panel 2, thereby improving uniformity of the light propagating through the display panel 2.

The display apparatus 1 according to the first modification of the configurational embodiment has no backlight and no reflection plate on the first principal surface 10A side of the first light-transmissive substrate 10 or the first principal surface 20A side of the second light-transmissive substrate 20, similarly to the configurational embodiment. This configuration allows a background on the first principal surface 20A side of the second light-transmissive substrate 20 to be visually recognized from the first principal surface 10A of the first light-transmissive substrate 10, or a background on the first principal surface 10A side of the first light-transmissive substrate 10 to be visually recognized from the first principal surface 20A of the second light-transmissive substrate 20. The display controller 5 then performs control so as to reduce the power consumption of the light-emitting device 31 in accordance with a signal ELV of external light intensity information supplied from an external light setting device 61. Alternatively, the display controller 5 performs control so as to reduce the power consumption of the display panel 2 in accordance with the signal ELV of the external light intensity information supplied from the external light setting device 61.

Second Modification

Figure 21:
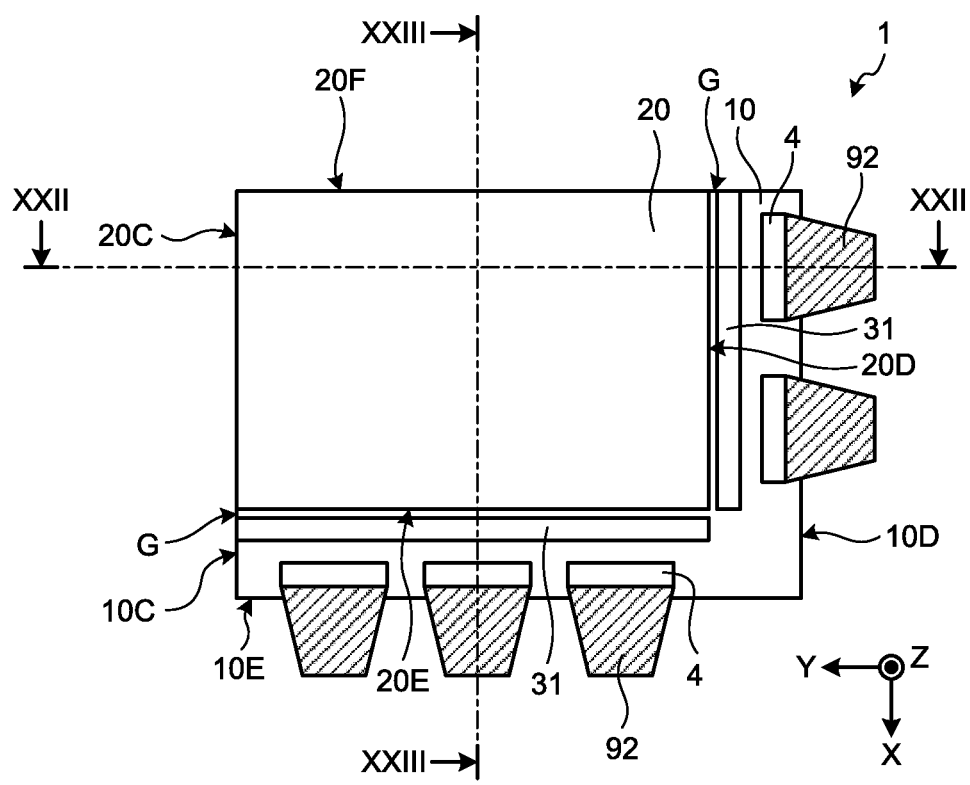
FIG. 21 is a plan view illustrating the plane of a display apparatus according to a second modification of the configurational embodiment.
Figure 22:
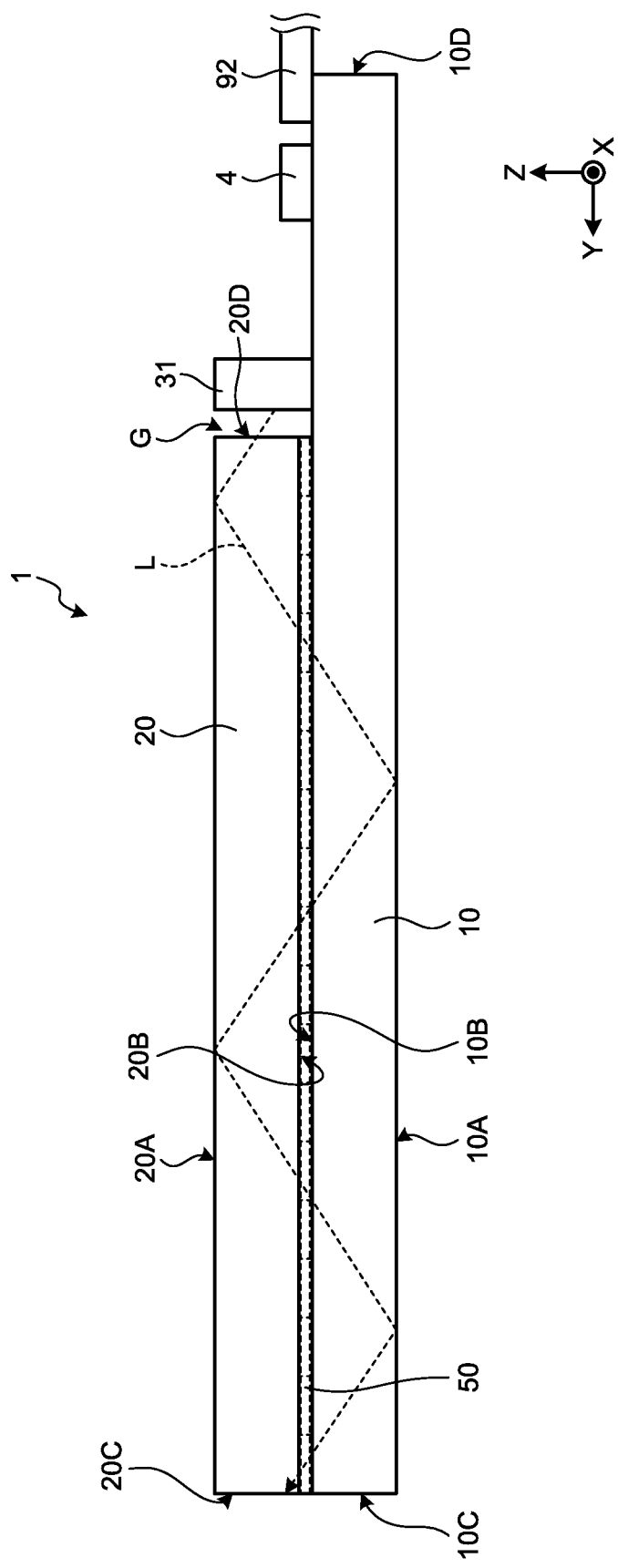
FIG. 22 is a cross-sectional view taken along line XXII-XXII illustrated in FIG. 21.
Figure 23:
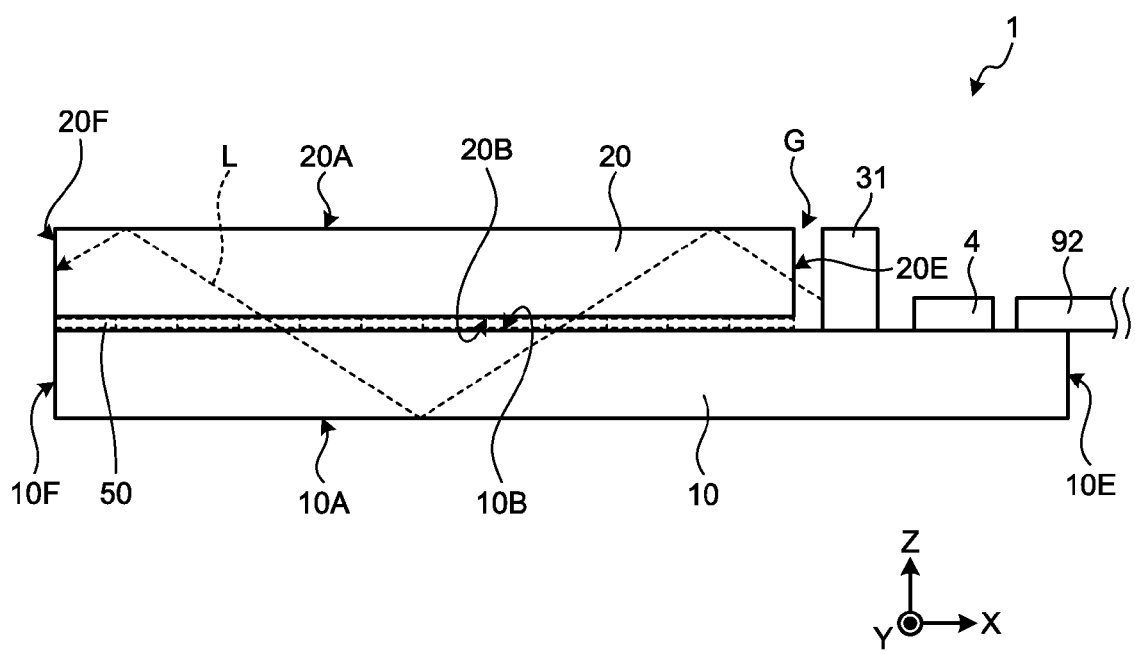
FIG. 23 is a cross-sectional view taken along line XXIII-XXIII illustrated in FIG. 21.

FIG. 21 is a plan view illustrating the plane of a display apparatus according to a second modification of the configurational embodiment. FIG. 22 is a cross-sectional view taken along line XXII-XXII illustrated in FIG. 21. FIG. 23 is a cross-sectional view taken along line XXIII-XXIII illustrated in FIG. 21. The same configuration elements as those described in the configurational embodiment and the modification thereof are denoted with the same reference signs, and overlapping description is omitted.

As illustrated in FIGS. 21 and 22, a light-emitting device 31 faces a second side surface 20D of a second light-transmissive substrate 20. As illustrated in FIG. 22, the light-emitting device 31 emits light source light L to the second side surface 20D of the second light-transmissive substrate 20. The second side surface 20D, which faces the light-emitting device 31, of the second light-transmissive substrate 20 serves as a light incident surface. A gap G is provided between the light-emitting device 31 and the light incident surface. The gap G serves as an air layer.

As illustrated in FIG. 22, the light source light L emitted from the light-emitting device 31 propagates in a direction away from the second side surface 20D while being reflected at a first principal surface 10A of a first light-transmissive substrate 10 and a first principal surface 20A of the second light-transmissive substrate 20.

As illustrated in FIGS. 21 and 23, another light-emitting device 31 faces a third side surface 20E of the second light-transmissive substrate 20. As illustrated in FIG. 23, the light-emitting device 31 emits light source light L to the third side surface 20E of the second light-transmissive substrate 20. The third side surface 20E, which faces the light-emitting device 31, of the second light-transmissive substrate 20 serves as a light incident surface. A gap G is provided between the light-emitting device 31 and the light incident surface. The gap G serves as an air layer.

As illustrated in FIG. 23, the light source light L emitted from the light-emitting device 31 propagates in a direction away from the third side surface 20E while being reflected at the first principal surface 10A of the first light-transmissive substrate 10 and the first principal surface 20A of the second light-transmissive substrate 20.

The display apparatus 1 according to the second modification of the configurational embodiment includes the first light-transmissive substrate 10, the second light-transmissive substrate 20, a liquid crystal layer 50, and the light-emitting devices 31. The two light-emitting devices 31 respectively face the second side surface 20D and the third side surface 20E of the second light-transmissive substrate 20. The configuration increases the amounts of the light emitted from the two light-emitting devices 31 and propagating through a display panel 2, thereby improving uniformity of the light propagating through the display panel 2.

The display apparatus 1 according to the second modification of the configurational embodiment has no backlight and no reflection plate on the first principal surface 10A side of the first light-transmissive substrate 10 or the first principal surface 20A side of the second light-transmissive substrate 20, similarly to the configurational embodiment. This configuration allows a background on the first principal surface 20A side of the second light-transmissive substrate 20 to be visually recognized from the first principal surface 10A of the first light-transmissive substrate 10, or a background on the first principal surface 10A side of the first light-transmissive substrate 10 to be visually recognized from the first principal surface 20A of the second light-transmissive substrate 20. A display controller 5 performs control so as to reduce the power consumption of the light-emitting devices 31 in accordance with a signal ELV of external light intensity information supplied from an external light setting device 61. Alternatively, the display controller 5 performs control so as to reduce the power consumption of the display panel 2 in accordance with the signal ELV of the external light intensity information supplied from the external light setting device 61.

Preferred embodiments of the present disclosure have been described. However, the present disclosure is not limited by these embodiments. The content disclosed in the embodiments is merely an example, and various modifications can be made without departing from the gist of the present disclosure. Appropriate modifications made without departing from the gist of the present disclosure obviously belong to the technical scope of the present disclosure. All the technologies that can be appropriately designed, modified, and implemented by a person skilled in the art on the basis of the above-described disclosure belong to the technical scope of the present disclosure as long as the technologies include the gist of the present disclosure.

For example, the display panel 2 may be a passive matrix panel without a switching element. The passive matrix panel includes, in plan view, a first electrode extending in the X direction, a second electrode extending in the Y direction, and wiring electrically coupled to the first electrode or the second electrode. The first electrode, the second electrode, and the wiring are formed of, for example, ITO. For example, the first light-transmissive substrate 10 including the above-described first electrode and the second light-transmissive substrate 20 including the second electrode face each other with the liquid crystal layer 50 interposed therebetween.

The example in which the first orientation film 55 and the second orientation film 56 are the vertical orientation films has been described. However, the first orientation film 55 and the second orientation film 56 may be horizontal orientation films. The first orientation film 55 and the second orientation film 56 only need to have a function to orient the monomers in a predetermined direction in polymerizing the monomers. This allows the monomers to become polymers oriented in the predetermined direction. When the first orientation film 55 and the second orientation film 56 are the horizontal orientation films, the direction of the optical axis Ax1 of the bulk 51 and the direction of the optical axis Ax2 of the fine particle 52 are the same, and are perpendicular to the Z direction, in a state in which no voltage is applied between the pixel electrode 16 and the common electrode 22. The direction perpendicular to the Z direction corresponds to the X direction or the Y direction along a side of the first light-transmissive substrate 10 in plan view.

The embodiments and the modifications include the following aspects.

(1) A display apparatus comprising:
 a first light-transmissive substrate;
 a second light-transmissive substrate facing the first light-transmissive substrate;
 a liquid crystal layer sealed between the first light-transmissive substrate and the second light-transmissive substrate, and including polymer dispersed liquid crystal;
 at least one light-emitting device facing at least one of a side surface of the first light-transmissive substrate or a side surface of the second light-transmissive substrate; and
 a display controller configured to perform control so as to reduce power consumption based on a signal, the signal being in accordance with a signal of external light intensity information supplied from an external light setting device.

(2) The display apparatus according to (1), wherein
 the first light-transmissive substrate includes a first principal surface and a second principal surface that is a plane parallel to the first principal surface,
 the second light-transmissive substrate includes a first principal surface and a second principal surface that is a plane parallel to the first principal surface, and
 when the liquid crystal layer is in a non-scattering state, a background on the first principal surface side of the second light-transmissive substrate is visually recognized from the first principal surface of the first light-transmissive substrate, or a background on the first principal surface side of the first light-transmissive substrate is visually recognized from the first principal surface of the second light-transmissive substrate.

(3) The display apparatus according to (1) or (2), wherein the display controller is configured to decrease an amount of light emitted from the at least one light-emitting device in accordance with the signal of the external light intensity information.

(4) The display apparatus according to any one of (1) to (3), further comprising a first electrode and a second electrode with the liquid crystal layer interposed therebetween,
 wherein the display controller is configured to set a voltage applied to the first electrode in accordance with an image input signal, and decrease the voltage applied to the first electrode in accordance with the signal of the external light intensity information.

(5) The display apparatus according to (4), wherein,
 a first maximum voltage applied to the first electrode is a voltage by which a radiance gradation value takes a maximum value in a state in which there is external light, in accordance with the signal of the external light intensity information,
 a second maximum voltage applied to the first electrode is a voltage by which a radiance gradation value of the image input signal takes a maximum value, and
 the display controller is configured to calculate a voltage ratio between the first maximum voltage and the second maximum voltage and multiply the voltage applied to the first electrode, which is set based on the image input signal, by the voltage ratio, so as to decrease the voltage applied to the first electrode.

(6) The display apparatus according to any one of (1) to (4), further comprising a first electrode and a second electrode with the liquid crystal layer interposed therebetween,
 wherein, when a color gradation value of a white component generated by mixing a first color, a second color, and a third color set based on an image input signal and a color gradation value set based on the signal of the external light intensity information each exceed a maximum gradation value, the display controller is configured to decrease a voltage applied to the first electrode, which is set based on the image input signal, in accordance with the signal of the external light intensity information.

(7) The display apparatus according to any one of (1) to (6), wherein the external light setting device is an external light intensity sensor, and is configured to generate the signal of the external light intensity information in accordance with intensity of detected external light.

(8) The display apparatus according to any one of (1) to (6), wherein the external light setting device is a setting switch capable of changing a setting value of the external light intensity information, which is set based on intensity of external light in advance, and the external light setting device is configured to generate the signal of the external light intensity information in accordance with the setting value of the external light intensity information.

What is claimed is:
1. A display apparatus comprising:
 a first light-transmissive substrate;
 a second light-transmissive substrate facing the first light-transmissive substrate;
 a liquid crystal layer sealed between the first light-transmissive substrate and the second light-transmissive substrate, and including polymer dispersed liquid crystal;
 at least one light-emitting device facing at least one of a side surface of the first light-transmissive substrate or a side surface of the second light-transmissive substrate;
 a display controller configured to perform control so as to reduce power consumption based on a signal, the signal being in accordance with a signal of external light intensity information supplied from an external light setting device; and a first electrode and a second electrode with the liquid crystal layer interposed therebetween, wherein the display controller is configured to set a voltage applied to the first electrode in accordance with an image input signal, and decrease the voltage applied to the first electrode in accordance with the signal of the external light intensity information, a first maximum voltage applied to the first electrode is a voltage by which a radiance gradation value takes a maximum value in a state in which there is external light, in accordance with the signal of the external light intensity information, a second maximum voltage applied to the first electrode is a voltage by which a radiance gradation value of the image input signal takes a maximum value, and the display controller is configured to calculate a voltage ratio between the first maximum voltage and the second maximum voltage and multiply the voltage applied to the first electrode, which is set based on the image input signal, by the voltage ratio, so as to decrease the voltage applied to the first electrode.

2. The display apparatus according to claim 1, wherein the first light-transmissive substrate includes a first principal surface and a second principal surface that is a plane parallel to the first principal surface, the second light-transmissive substrate includes a first principal surface and a second principal surface that is a plane parallel to the first principal surface, and when the liquid crystal layer is in a non-scattering state, a background on the first principal surface side of the second light-transmissive substrate is visually recognized from the first principal surface of the first light-transmissive substrate, or a background on the first principal surface side of the first light-transmissive substrate is visually recognized from the first principal surface of the second light-transmissive substrate.

3. The display apparatus according to claim 1, wherein the display controller is configured to decrease an amount of light emitted from the at least one light-emitting device in accordance with the signal of the external light intensity information.

4. The display apparatus according to claim 1, wherein the external light setting device is an external light intensity sensor, and is configured to generate the signal of the external light intensity information in accordance with intensity of detected external light.

5. The display apparatus according to claim 1, wherein the external light setting device is a setting switch capable of changing a setting value of the external light intensity information, which is set based on intensity of external light in advance, and the external light setting device is configured to generate the signal of the external light intensity information in accordance with the setting value of the external light intensity information.

6. A display apparatus comprising:
a first light-transmissive substrate;
a second light-transmissive substrate facing the first light-transmissive substrate;
a liquid crystal layer sealed between the first light-transmissive substrate and the second light-transmissive substrate, and including polymer dispersed liquid crystal;
at least one light-emitting device facing at least one of a side surface of the first light-transmissive substrate or a side surface of the second light-transmissive substrate;
a display controller configured to perform control so as to reduce power consumption based on a signal, the signal being in accordance with a signal of external light intensity information supplied from an external light setting device; and
a first electrode and a second electrode with the liquid crystal layer interposed therebetween,
wherein, when a color gradation value of a white component generated by mixing a first color, a second color, and a third color set based on an image input signal and a color gradation value set based on the signal of the external light intensity information each exceed a maximum gradation value, the display controller is configured to decrease a voltage applied to the first electrode, which is set based on the image input signal, in accordance with the signal of the external light intensity information.

7. The display apparatus according to claim 6, wherein the external light setting device is an external light intensity sensor, and is configured to generate the signal of the external light intensity information in accordance with intensity of detected external light.

8. The display apparatus according to claim 6, wherein the external light setting device is a setting switch capable of changing a setting value of the external light intensity information, which is set based on intensity of external light in advance, and the external light setting device is configured to generate the signal of the external light intensity information in accordance with the setting value of the external light intensity information.

* * * * *